(12) United States Patent
Ohashi

(10) Patent No.: US 9,283,838 B2
(45) Date of Patent: Mar. 15, 2016

(54) FUEL CELL SYSTEM PROTECTION IN A VEHICLE

(75) Inventor: Yasuhiko Ohashi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1014 days.

(21) Appl. No.: 13/260,101

(22) PCT Filed: May 28, 2009

(86) PCT No.: PCT/JP2009/059779
§ 371 (c)(1),
(2), (4) Date: Sep. 23, 2011

(87) PCT Pub. No.: WO2010/137150
PCT Pub. Date: Dec. 2, 2010

(65) Prior Publication Data
US 2012/0021301 A1 Jan. 26, 2012

(51) Int. Cl.
*H01M 8/00* (2006.01)
*B60K 1/04* (2006.01)
(Continued)

(52) U.S. Cl.
CPC . *B60K 1/04* (2013.01); *B60L 1/003* (2013.01); *B60L 3/0053* (2013.01); *B60L 7/16* (2013.01); *B60L 11/1803* (2013.01); *B60L 11/1877* (2013.01); *B60L 11/1881* (2013.01); *B60L 11/1887* (2013.01); *B60L 11/1892* (2013.01);
(Continued)

(58) Field of Classification Search
CPC .............. H01M 8/247; H01M 8/2475; H01M 2250/20; Y02E 60/50; Y02T 90/32; Y02T 90/34; Y02T 10/705; Y02T 10/7241; Y02T 10/7216; B60K 1/04; B60K 2001/0438; B60L 11/1881; B60L 1/003; B60L 3/0053; B60L 7/16; B62D 25/2072
USPC ......... 429/467, 469, 470, 471, 507, 508, 452, 429/430; 180/65.1, 65.21
See application file for complete search history.

(56) References Cited

U.S. PATENT DOCUMENTS 5,515,939 A 5/1996 Korall et al.
5,555,950 A 9/1996 Harada et al.
(Continued)

FOREIGN PATENT DOCUMENTS

CN 1482971 A 3/2004
CN 101395023 A 3/2009
(Continued)

OTHER PUBLICATIONS

Final Office Action issued on Apr. 15, 2014, in U.S. Appl. No. 13/258,523.
(Continued)

*Primary Examiner* — Raymond Alejandro
(74) *Attorney, Agent, or Firm* — Kenyon & Kenyon LLP

(57) ABSTRACT

Provided is a protective structure for a fuel cell system in a vehicle. The fuel cell system includes a fuel cell unit accommodating a fuel cell and a related device disposed adjacently to the fuel cell unit. The protective structure enables effective protection of the fuel cell unit and the related device from impacts from below the vehicle. The fuel cell unit and the related device are provided at respective protective structural bodies. An under-panel is provided on at least one of the bottom surfaces of the protective structural bodies. A floor panel covers commonly the bottom surface sides of the fuel cell unit and the related device.

8 Claims, 10 Drawing Sheets

(51) Int. Cl.
  *B60L 11/18* (2006.01)
  *B62D 25/20* (2006.01)
  *H01M 8/24* (2006.01)
  *B60L 1/00* (2006.01)
  *B60L 3/00* (2006.01)
  *B60L 7/16* (2006.01)

(52) U.S. Cl.
  CPC ......... *B60L 11/1896* (2013.01); *B60L 11/1898* (2013.01); *B62D 25/2072* (2013.01); *H01M 8/247* (2013.01); *H01M 8/2475* (2013.01); *B60K 2001/0438* (2013.01); *B60L 2200/26* (2013.01); *B60L 2210/10* (2013.01); *B60L 2210/40* (2013.01); *B60L 2240/36* (2013.01); *B60L 2240/421* (2013.01); *H01M 2250/20* (2013.01); *Y02E 60/50* (2013.01); *Y02T 10/642* (2013.01); *Y02T 10/705* (2013.01); *Y02T 10/7216* (2013.01); *Y02T 10/7241* (2013.01); *Y02T 90/32* (2013.01); *Y02T 90/34* (2013.01)

(56) References Cited

U.S. PATENT DOCUMENTS

| | | |
|---|---|---|
| 6,819,066 B2 | 11/2004 | Ishikawa et al. |
| 8,037,960 B2 | 10/2011 | Kiya |
| 8,330,429 B2 | 12/2012 | Arakawa |
| 2003/0070850 A1 | 4/2003 | Reid et al. |
| 2003/0070858 A1 | 4/2003 | Kondo |
| 2003/0215687 A1 | 11/2003 | Bruck et al. |
| 2004/0129466 A1 | 7/2004 | Leifert |
| 2004/0137321 A1 | 7/2004 | Savaria et al. |
| 2004/0161654 A1 | 8/2004 | DeVries |
| 2006/0102413 A1 | 5/2006 | Ootani et al. |
| 2006/0113131 A1 | 6/2006 | Kato et al. |
| 2006/0251933 A1* | 11/2006 | Hoffjann et al. ............. 429/13 |
| 2006/0272877 A1 | 12/2006 | Nozaki et al. |
| 2007/0007060 A1 | 1/2007 | Ono et al. |
| 2007/0215397 A1 | 9/2007 | Suzuki |
| 2008/0196957 A1 | 8/2008 | Koike et al. |
| 2009/0173558 A1 | 7/2009 | Watanabe et al. |

FOREIGN PATENT DOCUMENTS

| | | |
|---|---|---|
| DE | 69302845 T2 | 11/1996 |
| DE | 10247304 A1 | 6/2003 |
| DE | 10242619 A1 | 3/2004 |
| JP | 07-108956 A | 4/1995 |
| JP | 7-117489 A | 5/1995 |
| JP | 7117489 A | 5/1995 |
| JP | 10-291419 A | 11/1998 |
| JP | 2002-367648 A | 12/2002 |
| JP | 2003123779 A | 4/2003 |
| JP | 2003-146087 A | 5/2003 |
| JP | 2003-189415 A | 7/2003 |
| JP | 2004-161092 A | 6/2004 |
| JP | 2004-345447 A | 12/2004 |
| JP | 2005-205945 A | 8/2005 |
| JP | 2005-231549 A | 9/2005 |
| JP | 2005-306104 A | 11/2005 |
| JP | 2006-168604 A | 6/2006 |
| JP | 2006-176105 A | 7/2006 |
| JP | 2006-196386 A | 7/2006 |
| JP | 2006-256442 A | 9/2006 |
| JP | 2006-335212 A | 12/2006 |
| JP | 2007-015591 A | 1/2007 |
| JP | 2007-015600 A | 1/2007 |
| JP | 2007-015612 A | 1/2007 |
| JP | 2007-015613 A | 1/2007 |
| JP | 2007-015614 A | 1/2007 |
| JP | 2007-015616 A | 1/2007 |
| JP | 2007-039004 A | 2/2007 |
| JP | 2007-106361 A | 4/2007 |
| JP | 2007-209161 A | 8/2007 |
| JP | 2007-230329 A | 9/2007 |
| JP | 2007-237779 A | 9/2007 |
| JP | 2007-245954 A | 9/2007 |
| JP | 2007-258164 A | 10/2007 |
| JP | 2007-318938 A | 12/2007 |
| JP | 2008-100584 A | 5/2008 |
| JP | 2008-100585 A | 5/2008 |
| JP | 2009-023528 A | 2/2009 |
| JP | 2009-083598 A | 4/2009 |
| JP | 2009-148051 A | 7/2009 |
| WO | 03/104010 A1 | 12/2003 |
| WO | 2009/001483 A1 | 12/2009 |

OTHER PUBLICATIONS

U.S. Office Action of Dec. 20, 2012 U.S. Appl. No. 13/258,539.
International Search Report issued Jul. 21, 2009 of PCT/JP2009/059785.
International Search Report issued Jul. 21, 2009 of PCT/JP2009/059779.
International Search Report issued Jul. 21, 2009 of PCT/JP2009/059774.
International Search Report issued Jul. 21, 2009 of PCT/JP2009/059777.
Notice of Allowance dated Jul. 25, 2014, for U.S. Appl. No. 13/258,523.
Notice of Allowance dated Sep. 18, 2014 (with corrected Notice of Allowability dated Oct. 23, 2014), for U.S. Appl. No. 13/259,902.
Notice of Allowance dated Jul. 25, 2014 (already of record, but now with corrected Notice of Allowability dated Nov. 17, 2014), for U.S. Appl. No. 13/258,521.
Corrected Notice of Allowability issued Dec. 23, 2014 in U.S. Appl. No. 13/259,902.
Corrected Notice of Allowability issued Feb. 20, 2015, in U.S. Appl. No. 13/259,902.
Notice of Allowance dated Jun. 11, 2015 for U.S. Appl. No. 13/259,902.

* cited by examiner (A)

(B)

(A)

(B)

FUEL CELL SYSTEM PROTECTION IN A VEHICLE

This is a 371 national phase application of PCT/JP2009/059779 filed May 28, 2009, the contents of which are incorporated herein by reference.

TECHNICAL FIELD

The present invention relates to a vehicle having a fuel cell system installed thereon, and more particularly to a protective structure for a fuel cell or a related device of the fuel cell, such as a DC/DC converter.

Background Art

A vehicle configured to travel when power is supplied from a fuel cell system and a vehicle travel motor is driven (referred to hereinbelow as "fuel cell vehicle") has been disclosed. In the fuel cell vehicle, safety in the event of collision is ensured by disposing the structural members of the fuel cell system at the floor lower portion in the center of the vehicle.

For example, Japanese Patent Application Laid-open No. 2005-205945 discloses a structure installed on a vehicle, in which a fuel cell unit and an auxiliary unit are adjacently disposed at the lower portion of the vehicle floor surrounded by the a floor frame provided in the vehicle front-rear direction of the fuel cell vehicle and a cross member provided in the vehicle width direction. With such a structure, the piping length and wiring length can be reduced and safety in the event of collision can be ensured (Patent Literature 1).

Japanese Patent Application Laid-open No. 2004-161092 discloses a structure in which a fuel cell box holding a fuel cell and a fuel cell dilution box and a subframe holding a fuel gas tank are disposed side by side in the front-rear direction. The specific feature of the structure is that the fuel gas dilution box is disposed on the sub-frame side of the fuel cell inside the fuel cell box. With such a configuration, the collision energy received by the subframe in the event of vehicle collision is absorbed by deformation of the fuel gas dilution box (Patent Literature 2).

A DC-DC converter that rises and lowers the output voltage of a fuel cell is disclosed, for example, in Japanese Patent Application Laid-open No. 2007-209161 and Japanese Patent Application Laid-open No. 2007-318938. These Literatures do not specifically disclose the impact moderation structure for the DC-DC converter (Patent Literature 3 and Patent Literature 4).

CITATION LIST

Patent Literatures

Patent Literature 1: JP2005-205945 A
Patent Literature 2: JP2004-161092 A
Patent Literature 3: JP2007-209161 A
Patent Literature 4: JP2007-318938 A

SUMMARY OF INVENTION

Technical Problem

However, in the onboard structures according to the above-mentioned related art, the fuel cell unit cannot be sufficiently protected from collisions with objects from the bottom surface side of the fuel cell vehicle.

For example, with the technique described in Patent Document 1, although the floor frame absorbs the side collision impact and moderates the impact on the fuel cell unit, the fuel cell unit cannot be protected from impacts from the ground surface. With the technique described in Patent Document 2, although the energy of collision from the transverse direction is absorbed by deformation of the fuel gas dilution box, impact energy from the ground surface cannot be absorbed. Patent Documents 3 and 4 do not disclose specific impact absorbing structures.

In particular, with the structure described in Patent Document 1, since the fuel cell system is disposed on the lower side of the occupant cabin, the distance between the fuel cell or related device and the ground surface is inevitably small. Therefore, where the bottom surface of the fuel cell vehicle collides with a protrusion on the travel surface (this event can be also hereinbelow called "road surface interference"), a strong impact can be directly applied to the fuel cell or related device.

It is an object of the present invention to provide a fuel cell system and a vehicle that makes it possible to protect effectively a fuel cell or a related device from collisions from below with a comparatively lightweight structure.

Solution to Problem

In order to resolve the above-described problems, the present invention provides a fuel cell system including: a fuel cell unit accommodating a fuel cell; and a related device disposed adjacently to the fuel cell unit, wherein the fuel cell unit and the related device are provided at respective protective structural bodies; and at least one of the protective structural body at which the fuel cell unit is provided and the protective structural body at which the related device is provided includes an under-panel on a bottom surface of one of the protective structural bodies.

The vehicle in accordance with the present invention is a vehicle configured to be capable of moving on a travel surface, the vehicle including a fuel cell unit accommodating a fuel cell; and a related device disposed adjacently to the fuel cell unit, wherein the fuel cell unit and the related device are provided at respective protective structural bodies; and at least one of the protective structural body at which the fuel cell unit is provided and the protective structural body at which the related device is provided includes an under-panel on a bottom surface of one of the protective structural bodies.

With such a configuration, the fuel cell unit and related device are disposed on respective protective structural bodies and an under-panel is provided at the bottom surface of the protective structural body. Since a gap is formed by the protective structural body between the fuel cell unit or related device and the under-panel, fuel gas or the like can be ventilated. Further, impact from the travel surface can be absorbed by the under-panel provided at the lowermost surface and the fuel cell unit and related device can be protected.

In accordance with the present invention, the following features can be added, if desirable.

(1) The under-panel can be configured to include a reinforcing frame.

With such a configuration, by including the reinforcing frame it is possible to increase the rigidity of the entire panel even when a material of a comparatively small weight, that is, comparatively low rigidity, is used as the main material of the under-panel.

(2) The under-panel can be configured to include carbon fibers.

With such a configuration, since carbon fibers are included, it is possible to provide the under-panel that excels in wear resistance, heat resistance, thermal extension-contraction ability, resistance to acids, low electric conductivity, and resistance to tension. In particular, since carbon fibers are lighter than metals such as aluminum, the carbon fibers are suitable as a protective structure to be installed on a vehicle.

(3) At least one of the protective structural body at which the fuel cell unit is provided and the protective structural body at which the related device is provided may include an impact suppressing portion that suppresses impacts from a forward direction of a vehicle.

With such a configuration, since the impact suppressing portion suppresses impacts from the forward direction, impacts from the forward direction that can be supposed to occur in the case of installation on a vehicle that travels can be effectively moderated.

(4) The fuel cell system can be installed on a vehicle and the protective structural body at which the fuel cell unit is provided and the protective structural body at which the related device is provided can be tightened to a frame constituting the vehicle.

With such a configuration, since the protective structural bodies are tightened to the frame, which is a structural component of the vehicle, the fuel cell unit and the related devices do not receive stresses from the zone of tightening to the vehicle. Therefore, the fuel cell unit and related devices, which have a comparatively low rigidity, can be effectively protected from collision impacts.

(5) The protective structural body at which the fuel cell unit is provided is preferably disposed at a position at a height, from a travel surface of the vehicle, that is greater than that of the protective structural body at which the related device is provided.

With such a configuration, collision impacts from the travel surface are received by the protective structural body of the related device before they are received by the protective structural body of the fuel cell unit. Therefore, the fuel cell unit, which has particularly low resistance to collision impacts from the travel surface, can be effectively protected. Thus, the collision impacts from the travel surface propagate to the vehicle body via the protective structural body of the related device, the energy of collision is absorbed, and the probability of the impact reaching the fuel cell unit can be reduced.

(6) An electric system component is accommodated between the fuel cell and the protective structural body at which the fuel cell unit is provided.

With such a configuration, the protective structural body acts as a barrier receiving the collision impact, and when the impact is received, the protective structural body and the fuel cell unit move integrally. As a result, it is highly improbable that the space at the back side of the protective structural body, that is, between the upper surface of the protective structural body and the fuel cell unit, will collapse under the effect of collision impact. As a result, electric system components that have a low mechanical strength and can be easily fractured can be very advantageously accommodated in this space.

Advantageous Effects of Invention

In accordance with the present invention, the fuel cell unit or related device is disposed at a protective structural body equipped with an under-panel at the bottom surface. Therefore, the fuel cell and related device can be effectively protected from collision impacts from the travel surface with a comparatively lightweight structure.

DESCRIPTION OF EMBODIMENTS

Best modes for carrying out the present invention will be described below with reference to the appended drawings.

In the description of the drawings below, the same or similar components will be denoted by the same or similar reference symbols. The drawings are schematic representations. Therefore, specific dimensions or the like should be determined with reference to the description below. Further, it goes without saying that components are included that differ in dimensional relationship and ratio between the drawings.

Embodiment 1

Embodiment 1 of the present invention relates to a fuel cell system installed on a vehicle (fuel cell vehicle), and more particularly to a fuel cell system in which a fuel cell unit and a DC-DC converter, which is a related device, are disposed on a protective structural body provided with an under-panel including a reinforcing frame. In Embodiment 1, first, the configuration of the fuel cell system will be explained and then the structure of the fuel cell vehicle will be explained.

Definitions of Terms

The terms that are used in the description of the present invention will be defined below.

"Vehicle" (fuel cell vehicle): a structural body that can be moved by using electric power generated by a fuel cell, regardless of the movement principle. Vehicles in which the movement is performed by causing a force to act upon a travel surface (cars and railroad trains) and vehicles in which the movement is performed by causing a force to act upon a medium (airplanes, ships, submarines, etc.) are included in this definition. The vehicle may or may not transport people.

"Front": the side to which the vehicle advances when the shift is changed to the drive (operation); also referred to as "front direction" or "front side".

"Rear": the side to which the vehicle advances when the shift is changed to the rear (back); also referred to as "rear direction" or "rear side".

"Transverse": the transverse direction in the horizontal plane with respect to the abovementioned front direction or rear direction; also referred to as "transverse direction" or "width direction".

Figure 2:
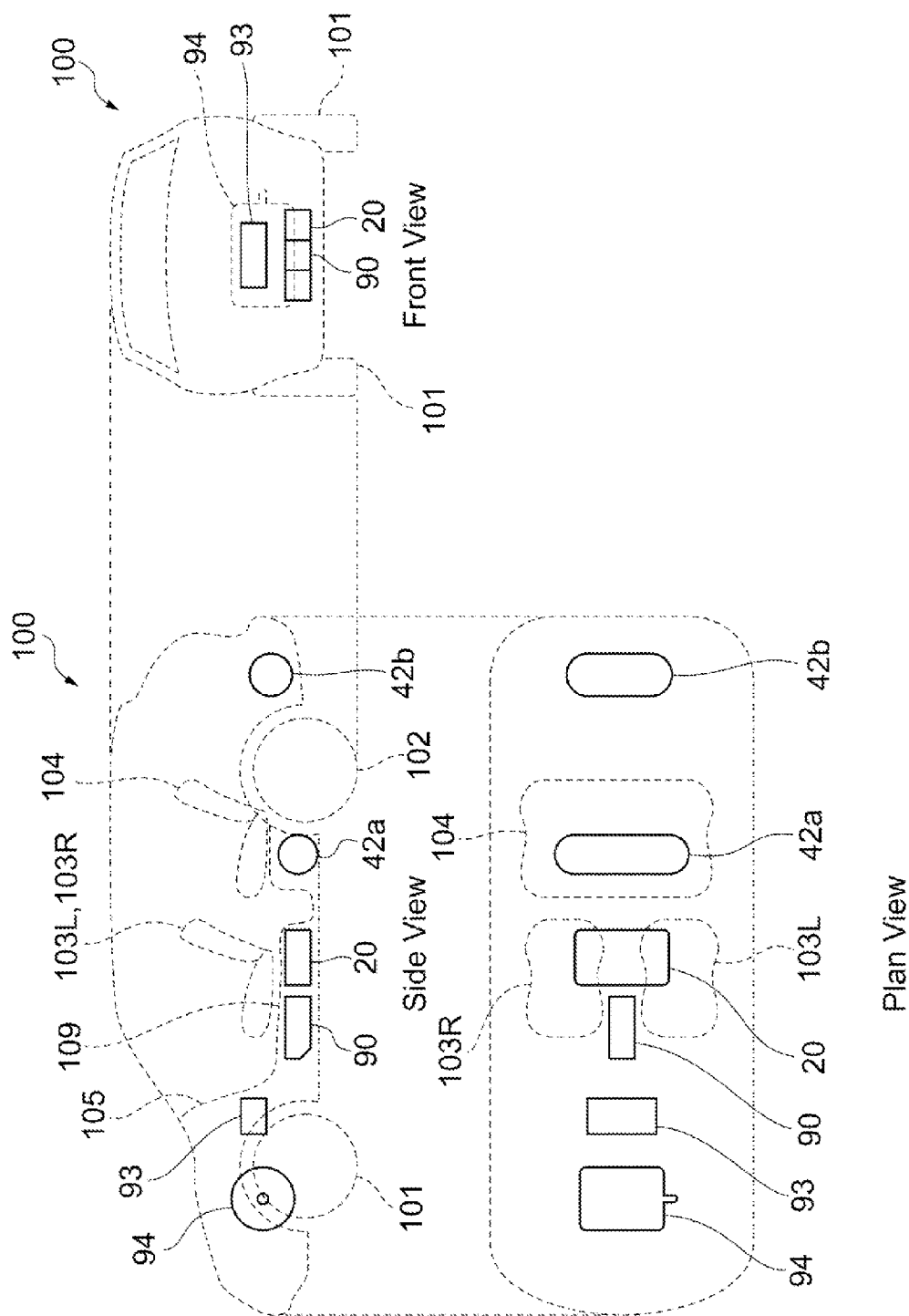
FIG. 2 shows a side view, a plan view, and a front view illustrating the arrangement of units of the fuel cell system in the vehicle according to Embodiment 1.

"Up": the direction vertical with respect to the travel surface, where the travel surface of the vehicle is taken as a reference (also referred to as "height direction") (the up direction in the side view and plan view in FIG. 2) is referred to as "up direction" or "upper side", and the downward direction (direction toward the road surface of the vehicle 100; down direction in the side view and plan view in FIG. 2) is referred to as "down direction" or "lower side".

"Related device": a constituent element, other than the fuel cell, that constitutes the fuel cell system, regardless of the type of the constituent element. the "related devices" include a converter, an auxiliary inverter, a vehicle travel inverter, a cooling pump, a drive pump, a compressor, and a battery. The related device is not necessarily electrically connected to the fuel cell.

"Adjacent": means that the distance between the fuel cell and the related device is small, but places no limitation on the distance. However, this is the distance such that where the present invention is not used, the related device can produce physical effect on the fuel cell when a collision impact is applied.

System Configuration

Figure 1:
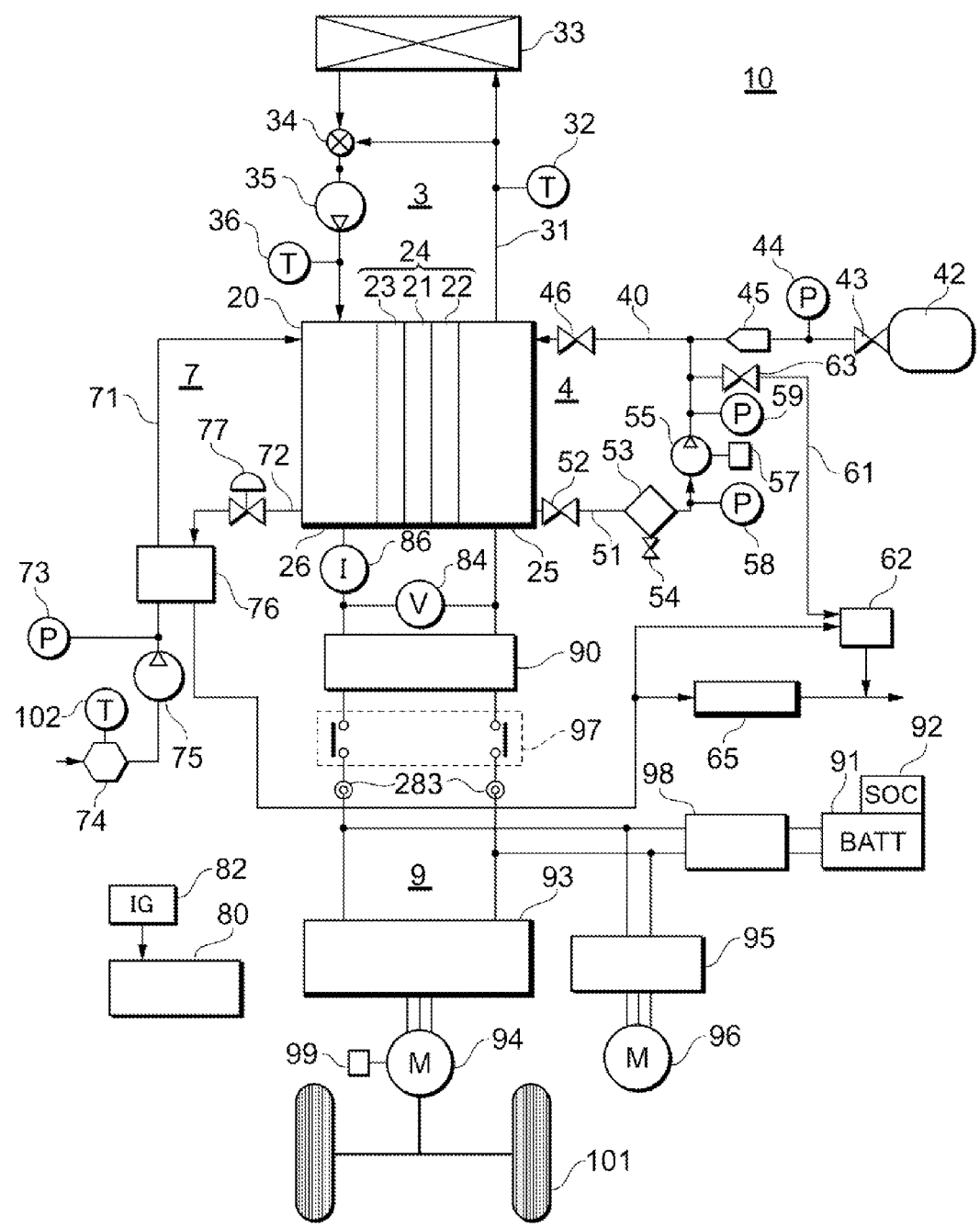
FIG. 1 is a system configuration diagram of the fuel cell system 10 according to the embodiment of the present invention.

FIG. 1 is a configuration diagram of the fuel cell system using the present invention.

A fuel cell system 10 in FIG. 1 is constituted by a fuel gas supply system 4, an oxidizing gas supply system 7, a cooling liquid supply system 3, and a power system 9. The fuel gas supply system 4 is a system for supplying a fuel gas (hydrogen gas) to a fuel cell 20. The oxidizing gas supply system 7 is a system for supplying an oxidizing gas (air) to the fuel cell 20. The cooling liquid supply system 3 is a system for cooling the fuel cell 20. The power system 9 is a system for charging and discharging the generated power from the fuel cell 20.

The fuel cell 20 is provided with a membrane—electrode assembly (MEA) 24 formed by screen printing an anode electrode 22 and a cathode electrode 23 on both surfaces of a polymer electrolyte membrane 21 constituted by a proton-conductive ion-exchange membrane formed from a fluororesin or the like. The membrane—electrode assembly 24 is sandwiched between separators (not shown in the figure) having flow channels for the fuel gas, oxidizing gas, and cooling water. Groove-like anode gas channel 25 and cathode gas channel 26 are formed between the separator and the anode electrode 22 and between the separator and the cathode electrode 23, respectively. The anode electrode 22 is constituted by providing a fuel electrode catalyst layer on a porous support layer, and the cathode electrode 23 is constituted by providing an air electrode catalyst layer on the porous support layer. These electrode catalyst layers are configured, for example, by attaching platinum particles. Electrochemical reactions such as represented by Equations (1) to (3) below proceed in the fuel cell 20.

$$H_2 \rightarrow 2H^+ 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

The reaction such as represented by Equation (1) proceeds at the anode electrode 22 side. The reaction such as represented by Equation (2) proceeds at the cathode electrode 23 side. The reaction such as represented by Equation (3) proceeds in the entire fuel cell 20. In order to induce such electrochemical reactions, the fuel cell 20 is installed on the vehicle in the form of a fuel cell unit in which the fuel cell is accommodated in the housing such as described hereinbelow.

For the sake of convenience of explanation, FIG. 1 shows schematically the structure of a unit cell constituted by the membrane—electrode assembly 24, anode gas channel 25, and cathode gas channel 26. Actually, a stack structure is provided in which a plurality of unit cells (a cell group) are connected in series, with the abovementioned separators being interposed therebetween.

The cooling liquid supply system 3 of the fuel cell system 10 is provided with a cooling channel 31, temperature sensors 32 and 35, a radiator 33, a valve 34, and a cooling liquid pump 35. The cooling channel 31 is a flow channel for circulating the cooling liquid. The temperature sensor 32 is temperature detection means for detecting the temperature of the cooling liquid discharged from the fuel cell 20. The radiator 33 is a heat exchanger for dissipating the heat of the cooling liquid to the outside. The valve 34 is valve means for adjusting the amount of cooling liquid flowing into the radiator 33. The cooling liquid pump 35 is drive means for pressurizing and circulating the cooling liquid by a motor (not shown in the figure). The temperature sensor 36 is temperature detection means for detecting the temperature of the cooling liquid supplied to the fuel cell 20.

A fuel gas supply device 42, a fuel gas supply channel 40, and a circulation path 51 are provided in the fuel gas supply system 4 of the fuel cell system 10. The fuel gas supply device 42 is storage means for storing the fuel gas (anode gas), for example, hydrogen gas. The fuel gas supply channel 40 is flow channel means for supplying the fuel gas from the fuel gas supply device 42 to the anode gas channel 25. The circulation path 51 is flow channel means (circulation path) for circulating the fuel off-gas discharged from the anode gas channel 25 in the fuel gas supply channel 40.

The fuel gas supply channel 42 is constituted, for example, by a high-pressure hydrogen tank, a hydrogen storage alloy, and a reformer. In the present embodiment, a first fuel gas tank 42a and a second fuel gas tank 42b are provided as the fuel gas supply deice 42.

A main valve 43, a pressure sensor 44, an ejector 45, and a cut-off valve 46 are disposed in the fuel gas supply channel 40. The main valve 43 is a cut-off valve that controls the fuel gas flowing out of the fuel gas supply device 42. The pressure sensor 44 is pressure detection means that is disposed downstream of the main valve 43 and serves for detecting a comparatively high pressure of fuel gas in a pipe upstream of the ejector 45. The ejector 45 is an adjustment valve that adjusts the fuel gas pressure inside the circulation path 51. The cut-off valve 46 is valve means for controlling the supply of fuel gas to the fuel cell 20.

A cut-off valve 52, a gas-liquid separator 53, a discharge valve 54, and a hydrogen pump 55 are provided in the circulation path 51. The cut-off valve 52 is valve means for controlling the supply of fuel off-gas from the fuel cell 20 to the circulation path 51. The gas-liquid separator 53 is separation means for removing moisture contained in the fuel off-gas.

The discharge valve 54 is valve means for discharging moisture separated by the gas-liquid separator 53. The hydrogen pump 55 is provided with a motor (not shown in the figure). The hydrogen pump 55 is drive means that is a forced circulation device for compressing the fuel off-gas that underwent a pressure loss when passing through the anode gas channel 25, rising the pressure thereof to the adequate gas pressure, and causing the reflow thereof to the fuel gas supply path 40. When the hydrogen pump 55 is driven, the fuel off-gas merges with the fuel gas supplied from the fuel gas supply device 42 in the merging point of the fuel gas supply channel 40 and the circulation path 51 and is then supplied to the fuel cell 20 and reused. A revolution speed sensor 57 that detects the revolution speed of the hydrogen pump 55 and pressure sensors 58, 59 that detect a circulation path pressure before and after the hydrogen pump 55 are disposed in the hydrogen pump 55.

A discharge flow channel 61 is branched in the circulation path 51. A purge valve 63 and a diluter 62 are provided in the discharge flow channel 61. The discharge flow channel 61 is discharge means for discharging the fuel off-gas discharged from the fuel cell 20 to the outside of the vehicle. The purge valve 63 is valve means for controlling the discharge of the fuel off-gas. Where the purge valve 63 is opened and closed, the circulation inside the fuel cell 20 is repeated, the fuel off-gas with increased concentration of impurities is discharged to the outside, and the decrease in cell voltage can be prevented by introducing new fuel gas. The diluter 62 is dilution means for diluting the fuel off-gas with the oxidation off-gas to a concentration such that causes no oxidation reaction. The diluter is, for example, a hydrogen concentration reduction device.

An oxidizing gas supply channel 71 and an oxidation off-gas discharge channel 72 are provided in the oxidizing gas supply system 7 of the fuel cell system 10. The oxidizing gas supply channel 71 is flow channel means for supplying the oxidizing gas (cathode gas) to the cathode gas channel 26. The oxidation off-gas discharge channel 72 is flow channel means for discharging the oxidation off-gas (cathode off-gas) discharged from the cathode gas channel 26.

An air cleaner 74 and an air compressor 75 are provided in the oxidizing gas supply channel 71. The air cleaner 74 is introducing and filtering means for introducing the air from the atmosphere and supplying the filtered air to the oxidizing gas supply channel 71. The air compressor 75 is drive means for compressing the introduced air with a motor (not shown in the figure) and pumping the compressed air as the oxidizing gas to the cathode gas channel 26. A pressure sensor 73 for detecting an air supply pressure of the air compressor 75 is disposed in the air compressor 75.

A humidifier 76 is provided between the oxidizing gas supply channel 71 and the oxidation off-gas discharge channel 72. The humidifier 76 performs humidity exchange between the oxidizing gas supply channel 71 and the oxidation off-gas discharge channel 72 and increases the humidity in the oxidizing gas supply channel 71.

A pressure regulating valve 77 and a muffler 65 are provided in the oxidation off-gas discharge channel 72. The pressure regulating valve 77 is pressure regulating means functioning as a regulator that regulates the discharge pressure of the oxidation off-gas discharge channel 72. The muffler 65 is sound absorbing means for absorbing the discharge sound of the oxidizing off-gas. The oxidation off-gas discharged from the pressure regulating valve 77 is branched. The oxidation off-gas of one branch flows into the diluter 62 and is diluted by mixing with the fuel off-gas retained in the diluter 62. The oxidation off-gas of the other branch passes through the muffler 65 where the noise is absorbed and then is mixed with the gas diluted by mixing in the diluter 62 and discharged to the outside of the vehicle.

A voltage sensor 84, a current sensor 86, a fuel cell FC converter 90, a battery 91, a battery computer 92, an inverter 93, a vehicle travel motor 94, an inverter 95, a high-voltage auxiliary device 96, a relay 97, and a battery DC-DC converter 98 are connected to the power system 9 of the fuel cell system 10.

The fuel cell DC-DC converter (referred to hereinbelow as "FC converter") 90 is voltage converting means for converting voltage between primary-side terminals and secondary-side terminals. More specifically, this converter is voltage converting means for converting a voltage between a primary side and a secondary side in which the output terminals of the fuel cell 20 are connected to the primary-side terminals of the converter, terminals of the output inverter 93 of the battery 91 are connected to the primary-side secondary-side terminals, and the output terminals of the fuel cell 20 are connected to the secondary-side terminals. The battery DC-DC converter (referred to hereinbelow as "battery converter") 98 is also voltage converting means for converting a voltage between the primary-side terminals and secondary-side terminals. More specifically, the primary-side terminals are connected to the output terminals of the battery 91, and the secondary-side terminals are connected to the input terminals of the inverter 93 and connected in parallel with the FC converter 90.

More specifically, the FC converter 90 boosts the output voltage of the fuel cell 20 connected to the primary-side terminals and supplies the boosted voltage to the input terminals of the inverter 93 connected to the secondary-side terminals. When power generated by the fuel cell 20 is insufficient, the battery converter 98 boosts the output voltage of the battery 91 connected to the primary-side terminals and supplies the boosted voltage to the input terminals of the inverter 93 connected to the secondary-side terminals. When excess power is generated in the fuel cell 20, the battery 91 is charged by the excess power of the fuel cell 20 via the FC converter 90 and the battery converter 98. When regenerated power is generated by the braking operation of the vehicle travel motor 94, the battery 91 is charged by the regenerated power via the battery converter 98. The converted voltage is supplied to charge the battery 91. In order to compensate the insufficiency of the power generated by the fuel cell 20 with respect to the power required for the vehicle travel motor 94, the FC converter 90 performs voltage conversion of the discharge power from the battery 91 and outputs the converted power to the secondary-side terminals. The FC converter 90 is provided with the relay 97, and where a predetermined impact is applied, the output terminals thereof are short circuited.

Thus, the FC converter 90 is provided with the relay 97 at the secondary-side terminals. The relay 97 maintains the conduction connection in the normal state. However, where the predetermined impact is applied to the FC converter 90, the relay 97 assumes a cut-off state, and the secondary-side terminals of the FC converter 90 are electrically disconnected from the inverter 93, inverter 95, and battery converter 98.

The secondary-side terminals of the FC converter 90 are electrically connected to the input terminals of the inverter 93 and the inverter 95 and to the secondary-side terminals of the battery converter 98 by the below-described power source plug 283.

The battery 91 is a storage device that stores, as a secondary battery, excess power and regenerated power. The battery computer 92 is monitoring means for monitoring the charge state of the battery 91. The inverter 93 is DC-AC converting means for converting the DC current outputted by the fuel cell 20 and supplied via the FC converter 90 or battery converter 98 into a three-phase AC current and supplying the obtained current to the vehicle travel motor 94 which is a load or drive object of the fuel cell 20. The vehicle travel motor 94 is drive means which is a main drive device of the fuel cell vehicle and serves for driving by using the three-phase AC current from the inverter 93. The inverter 95 is DC-AC converting means for supplying the AC power to various high-voltage auxiliary devices 96 constituting the fuel cell system 10. The high-voltage auxiliary device 96 is a general term for drive means using a motor other than the vehicle travel motor 94. More specifically, this term describes motors of the cooling liquid pump 35, hydrogen pump 55, air compressor 75, and inverter 95.

The voltage sensor 84 is voltage detection means for measuring the output volute of the fuel cell 20. The current sensor 86 is current detection means for measuring the output current of the fuel cell 20. The voltage sensor 84 and the current sensor 86 are used to detect the output voltage and output current of the fuel cell 20 and estimate the amount of moisture contained in the fuel cell 20.

The inverters 93 and 95 convert the DC current into a three-phase AC current and supply the converted current to the vehicle travel motor 94 and the high-voltage auxiliary device 96. A revolution speed sensor 99 that detects the revolution speed of the vehicle travel motor 94 is disposed at the vehicle travel motor 94. Front tires 101, which are wheels, are mechanically coupled by means of a differential to the vehicle travel motor 94, and the rotation power of the vehicle travel motor 94 can be converted into the driving power of the vehicle.

A control unit 80 for controlling the entire power generating configuration of the fuel cell system 10 is disposed in the fuel cell system 10. The control unit 80 is constituted by a general-use computer provided with a CPU (central processing unit), a RAM, a ROM, an interface circuit, and the like (not shown in the figure). The control unity 80 may be constituted by one computer or by a plurality of associated computers. The control unit 80 performs, for example, the control operations listed below, but this list is not limiting.

(1) A switch signal from the ignition switch 82 is inputted and the fuel cell system 10 is started or stopped.

(2) Detection signals of a gas pedal (not shown in the figure) and a shift position and the revolution speed signal from the revolution speed sensor 99 are taken in and a control parameter such as system requested power, which the necessary power supply amount, is computed.

(3) The revolution speed of the air compressor 75 is controlled on the basis of the relative value of pressure of the oxidizing gas supply channel 71 detected by the pressure sensor 73, so that the oxidizing gas supply amount to the oxidizing gas supply channel 71 assumes an appropriate value.

(4) The opening degree of the pressure adjusting valve 77 is controlled so that the amount of oxidation off-gas discharged into the oxidation off-gas discharge channel 72 becomes adequate.

(5) The opening degree of the main valve 43 or the adjusted pressure of the injector 45 is adjusted on the basis of the relative values of pressure detected by the pressure sensors 44, 58, 59, so that the oxidizing gas supply amount supplied to the fuel gas supply channel 40 assumes an adequate value.

(6) The revolution speed of the hydrogen pump 55 or the opening degree of the purge valve 63 is controlled, while monitoring the value of the revolution speed sensor 57, so that the fuel off-gas amount circulating to the circulation path 51 assumes an adequate value.

(7) Opening and closing of the main valve 43, cut-off valve 46, cut-off valve 52, or the like is controlled according to the operation mode.

(8) The circulation amount of cooling liquid is computed and the revolution speed of the cooling liquid pump 35 is controlled on the basis of the relative value of cooling liquid temperature detected by temperature sensors 32, 36.

(9) The AC impedance of the fuel cell 20 is calculated on the basis of the voltage value detected by the voltage sensor 84 and the current value detected by the current sensor 86, the moisture content of the electrolyte membrane is estimated and computed, and a scavenging amount at the time the vehicle stops is controlled.

(10) The power system 9 is controlled. For example, the FC converter 90, battery converter 98, inverters 93 and 95, vehicle travel motor 94, and high-voltage auxiliary deice 96 are controlled.

Arrangement of the Fuel Cell System in a Vehicle

The configuration of a fuel cell vehicle in Embodiment 1 will be explained below with reference to FIGS. 2 to 10. FIG. 2 shows the arrangement of principal units of the fuel cell system in the fuel cell vehicle. In FIG. 2, a side view, a plan view, and a front view are shown.

As shown in the side view and plan view in FIG. 2, the contours of a vehicle 100, a front tire 101, a rear tire 102, a front seat 103, and a rear seat 104 are shown by broken lines. As shown in the side view in FIG. 2, a dashboard 105 that partitions a compartment (referred to hereinbelow as an "occupant cabin") occupied by an occupant is shown by a large broken line. Contours of constituent units of the fuel cell system 10 are shown by solid lines. In FIG. 2, the arrangement of the fuel cell 20, FC converter 90, inverter 93, vehicle travel motor 94, first fuel gas tank 42a, and second fuel gas tank 42b, from among the constituent units of the fuel cell system 10, is shown by way of example.

As shown in the side view in FIG. 2, the constituent elements of the fuel cell system 10 are disposed in the lower side of the vehicle 100 partitioned by the dashboard 105. The space above the dashboard 105 is the occupant cabin. The fuel cell 20 is disposed below the front seat 103 in an almost central portion of the entire length of the vehicle in the front-rear direction of the vehicle and the vehicle width in the left-right direction. The FC converter 90 is disposed in front of the fuel cell 20 adjacently to the fuel cell 20 to be directly connected to the output terminals of the fuel cell 20. A tunnel portion 109 rising in the front-rear direction is provided between a right front seat 103R and a left front seat 103L in the dashboard 105 to enlarge the space for occupant's feet. The FC converter 90 is accommodated in the tunnel portion 109. The vehicle travel motor 94 is disposed at the front side of the vehicle 100 in the vicinity of front tires 101 in order to drive the front tires 101. The inverter 93 is disposed in the vicinity of the vehicle travel motor 94 to supply electric power to the vehicle travel motor 94. Since the first fuel gas tank 42a supplies a fuel gas to the fuel cell 20, this tank is positioned at the rear of the fuel cell 20.

As mentioned hereinabove, the fuel cell 20 and the FC converter 90 are provided close to the center of the vehicle 100 in the plan view and below the dashboard 105 in the side view. A frame extending in the front-rear direction of the vehicle 100 and a cross member extending in the width direction of the vehicle 100 are disposed so as to surround the fuel cell 20 and the FC converter 90. Therefore, the fuel cell and the FC converter are provided at positions in which fracture thereof is unlikely to occur in response to impacts from the front side of the vehicle 100 and also from the transverse direction. Further, since the fuel cell 20 is provided as a component of the fuel cell system in accordance with the present invention, as described hereinabove, very high endurance is ensured with respect to road surface interference, that is, impacts from below.

In the explanation below, the fuel cell 20 is disposed in the vehicle 100 in the form of a fuel cell assembly 200, and the FC converter 90 is disposed in the vehicle in the form of a converter assembly 250. The FC converter 90 is an example of the related device in accordance with the present invention.

Figure 3:
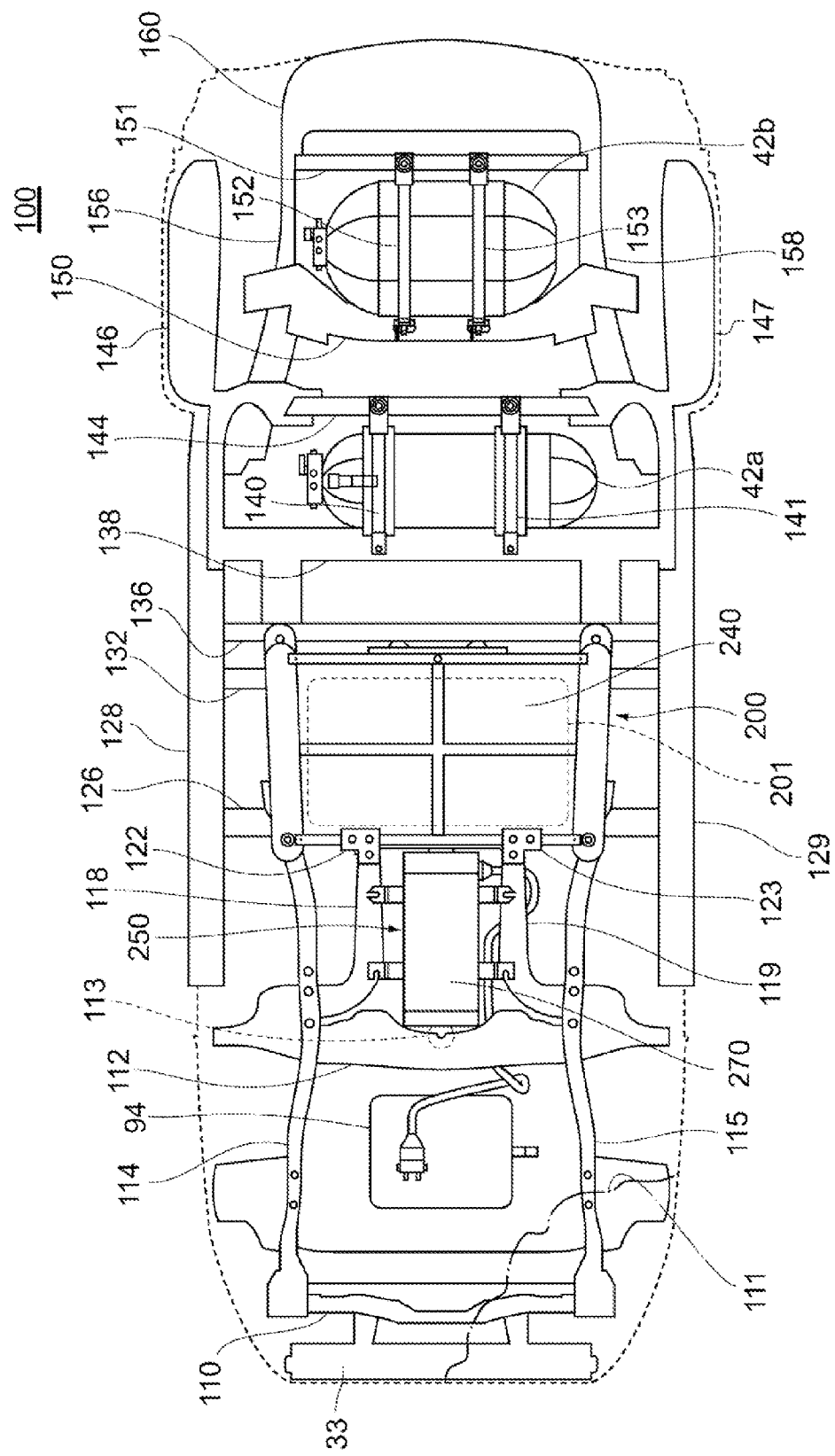
FIG. 3 is a bottom view of the vehicle including the arrangement of the fuel cell system according to Embodiment 1.

FIG. 3 is a bottom view of the vehicle including the arrangement of the fuel cell system according to Embodiment 1. The members such as the below-described frame, members, and pillars are constituted by metal materials having predetermined rigidity, for example, aluminum, SUS, and iron. The metal materials can be selected at will from the standpoint of processability, strength, endurance, weight, and cost. The metal materials may be subjected to well-known hardening processing, for example, quenching or alloying.

As shown in FIG. 3, a floor panel 111 is provided over the entire surface of the bottom portion of the vehicle 100. Front frames 114 and 115 are provided in the extending condition at the bottom in the front portion of the vehicle 100 and form a skeleton structure of the front portion of the vehicle 100. A front cross member 110 is provided in the frontmost portions of the front frame 114 and 115, and the radiator 33 shown in FIG. 1 is further attached thereto. A front suspension member 112 is provided at the rear side of the front cross member 110. The front suspension member 112 is tightened to the front frames 114 and 115. The vehicle travel motor 94 shown in FIGS. 1 and 2 is disposed in the region surrounded by the front cross member 110 and the front suspension member 112.

The fuel cell assembly 200 is tightened to the front frame 114 and the front frame 115 at the vehicle front side and tightened to a third cross member 136 at the vehicle rear side. As shown in FIG. 3, a pair of sub-frames 118 and 119 extend from behind the tightening position of the front suspension member 112 at the front frames 114 and 115 toward the fuel cell assembly 200. The end portions of sub-frames 118 and 119 are tightened together with a bracket 122 and a bracket 123 to the protecting structural body 220 (described below with reference to FIG. 5 etc.) of the fuel cell assembly 200. A converter assembly 250 (described below with reference to FIG. 5 etc.) is disposed between the pair of sub-frames 118 and 119. The converter assembly 250 is tightened to the sub-frames 118 and 119. An under-panel 240 is provided at the bottom surface of the protective structural body 220 constituting the fuel cell assembly 200. An under-panel 270 is provided at the bottom surface of the protective structural body 260 constituting the converter assembly 250.

A side rocker member 128 and a side roller member 129 are provided at the side surface of the vehicle 100. A first cross member 126, a second cross member 132, and a third cross member 136 are put across from the front side to the rear side and tightened to the side rocker members 128 and 129. These cross members provide a rigid structure acting against collision from the transverse direction of the vehicle 100. In accordance with the invention of the present application, the fuel cell assembly 200 is disposed between the first cross member 126 and the third cross member 136 in the front-rear direction and between the front frame 114 and the front frame 115 in the width direction, in the plan view thereof.

A rear rocker member 146 and a rear rocker member 147 extend from the rear sides of the side rocker members 128 and 129 toward the periphery of the rear tires 102 in the rear portion of the vehicle 100. A fourth cross member 138, a fifth cross member 150, and a rear cross member 160 are put across from the front side to the rear side and are tightened to the rear rocker members 146 and 147. These cross members provide a rigid structure acting against collision from the transverse direction of the rear portion of the vehicle. In the rear rocker members 146 and 147, a sub-cross member 144 is put across at the rear side of the fourth cross member 138, and the first fuel gas tank 42a is disposed between the fourth cross member 138 and the sub-cross member 144. A binder 140 and a binder 141 are provided and the first fuel gas tank 42a is fixed between the fourth cross member 138 and the sub-cross member 144. A sub-cross member 151 is put across at the rear portion of the fifth cross member 150, and the second fuel gas tank 42b is disposed between the fifth cross member 150 and the sub-cross member 151. A binder 152 and a binder 153 are provided and the second fuel gas tank 42b is fixed between the fifth cross member 150 and the sub-cross member 151.

In the above-described configuration, a notch-like deformation enhancing portion 113 is provided at the rear side of the central portion of the front suspension member 112. Where an impact of collision is applied from the vehicle front side and the front suspension member 112 abuts on the converter assembly 250, the deformation enhancing portion 113 is easily deformed and folded, thereby absorbing the energy. As a result, the converter assembly 250 can be prevented from moving further rearward.

Figure 4:
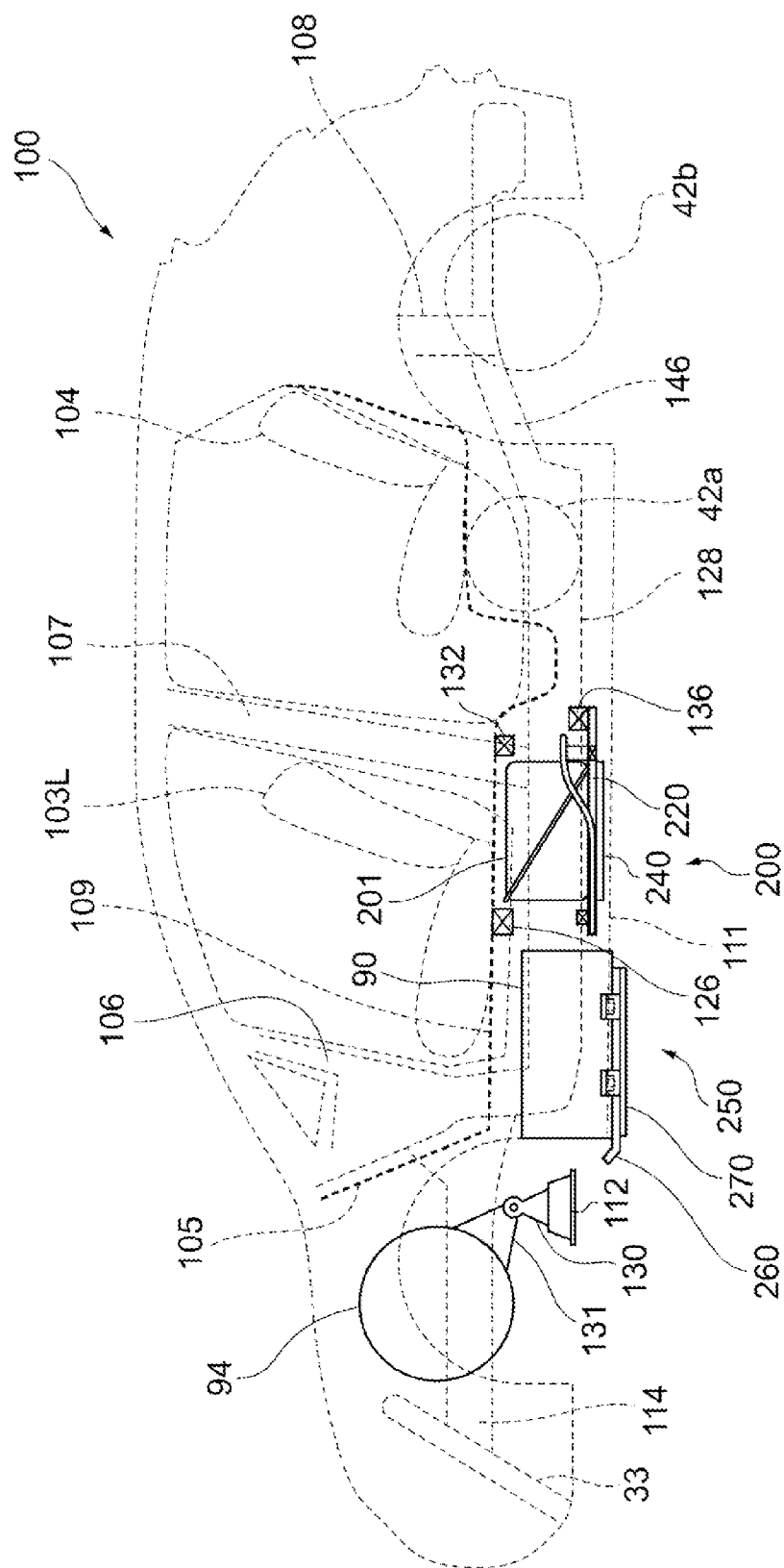
FIG. 4 is a side view of the vehicle including the arrangement of the fuel cell system according to Embodiment 1.

FIG. 4 is a side view of the vehicle including the arrangement of the fuel cell system according to Embodiment 1.

As shown in FIG. 4, the vehicle travel motor 94 is tightened to a motor mount 130 provided at the front suspension member 112, with a mounting rubber 131 being interposed therebetween. In such a configuration, where an impact of collision is applied from the vehicle front side, the vehicle travel motor 94 moves backward and the front suspension member 112 also moves backward. As has already been mentioned hereinabove with reference to FIG. 2, the fuel cell assembly 200 and the converter assembly 250 are disposed inside the tunnel portion 109 which is part of the dashboard 105 and provided between the front seats 103R and 103L. The fuel cell assembly 200 is configured that the fuel cell unit 201 is disposed at the protective structural body 220 having the under-panel 240 provided at the bottom surface thereof. The converter assembly 250 is configured so that the FC converter 90 is disposed at the protective structural body 260 provided with the under-panel 270. Front pillars 106 are arranged in a standing condition from the front side of the side rocker members 128 and 129, and a center pillar 107 is arranged in a standing condition from the central portion. A rear pillar 108 is arranged in a standing condition from the central portion of the rear rocker member 146. As has been mentioned hereinabove with reference to FIG. 3, the side rocker members 128 and 129 configure a skeleton structure in which the fuel cell assembly 200 is surrounded by the first cross member 126, second cross member 132, and third cross member 136.

In the above-described configuration, the frames, members, and pillars are all provided with a structure in which peaks and valleys are formed on a metal sheet or a rigid reinforced structure in which a plurality of such metal sheets are combined together. By using such structures, it is possible to provide a lightweight configuration with a high mechanical strength.

Structures of Fuel Cell Assembly 200 and Converter Assembly 250

The structures of the fuel cell assembly 200 and the converter assembly 250 will be described below in greater detail.

Figure 5:
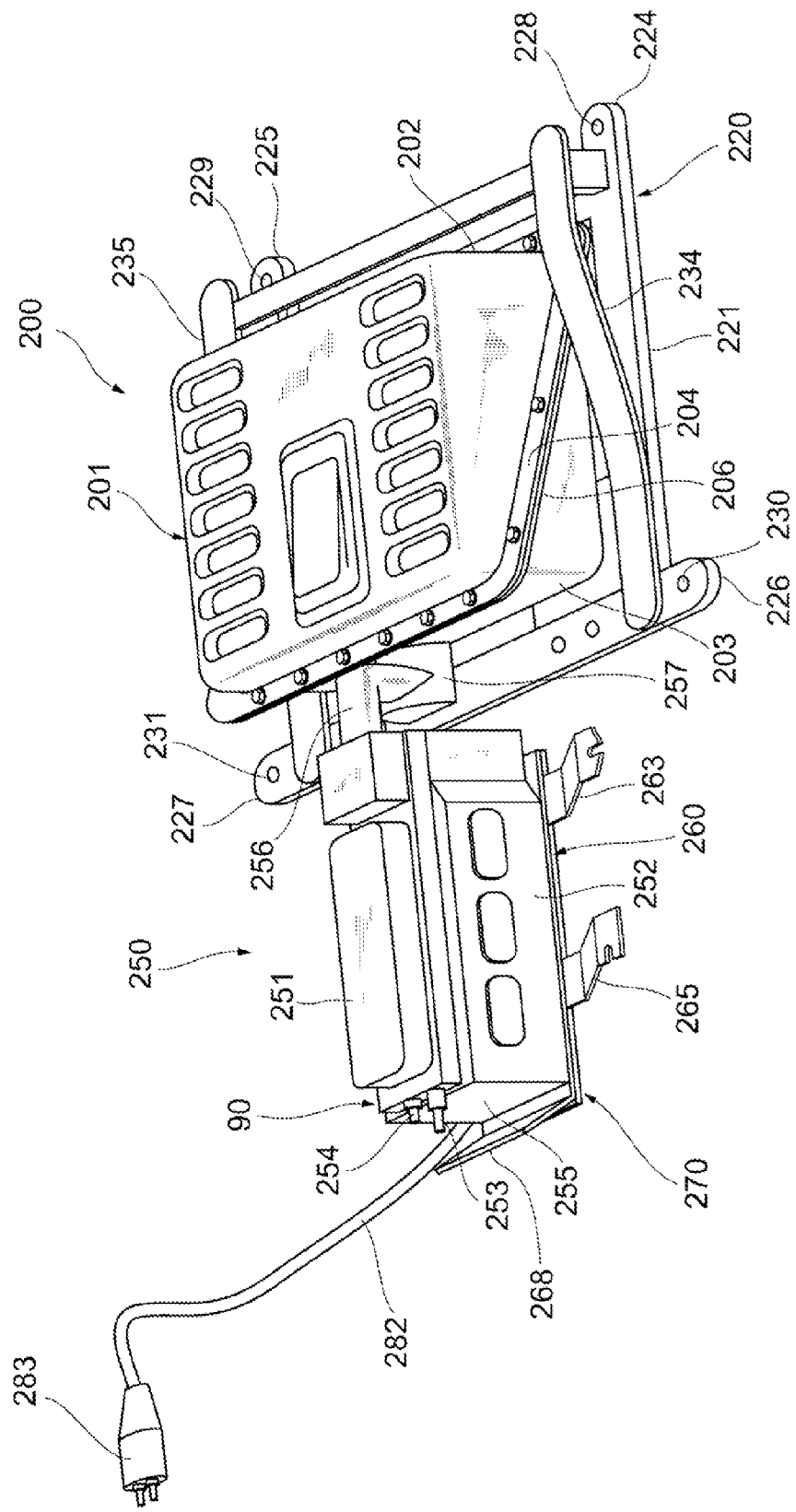
FIG. 5 is a perspective view of the fuel cell assembly 200 and the converter assembly 250 according to Embodiment 1.

FIG. 5 is a perspective view of the fuel cell assembly 200 and converter assembly 250 according to Embodiment 1. In the vehicle 100 shown in FIGS. 2 to 4, the converter assembly 250 and the fuel cell assembly 200 are disposed to be located on the front side and rear side, respectively.

Fuel Cell Assembly 200

As shown in FIG. 5, the fuel cell assembly 200 is configured by disposing the fuel cell unit 201 on the upper surface of the protective structural body 220. The under-panel 240 is disposed on the lower surface (bottom surface/rear surface) side of the protective structural body 220. The fuel cell unit 201 is configured by tightening together an upper housing 202 and a lower housing 203 so that an upper flange 204 and a lower flange 206 are aligned. The protective structural body 220 has an inclined frame 234 and an inclined frame 235 provided on two opposing sides of a frame structural body 221. A mounting portion 226 and a mounting portion 227 are provided in the corners on the front side of the frame structural body 221, and a mounting portion 224 and a mounting portion 225 are provided in the corners on the rear side. The front frames 114 and 115 shown in FIG. 3 are tightened to the mounting portions 226 and 227, and the third cross member 136 shown in FIG. 3 is tightened to the mounting portions 224 and 225.

As shown in FIG. 5, the protective structural body 220 is mounted on the vehicle 100 shown in FIGS. 2 to 4, so that the inclined frame 234 or 235 faces in the vehicle width direction. The fuel cell unit 201 is also mounted on the protective structural body 220 so that the inclined portions of the upper flange 204 and lower flange 206 are oriented in the vehicle width direction. In this case, as shown in FIG. 5, the fuel cell unit 201 is mounted on the protective structural body 220 so that the inclination direction of the upper flange 204 and the lower flange 206 is opposite to the inclination direction of the inclined frames 234 and 235 of the protective structural body 220. With such a configuration, the fuel cell assembly 200 according to the present embodiment has a structure that is exceptionally strong with respect to impacts from the transverse direction of the vehicle.

Figure 6:
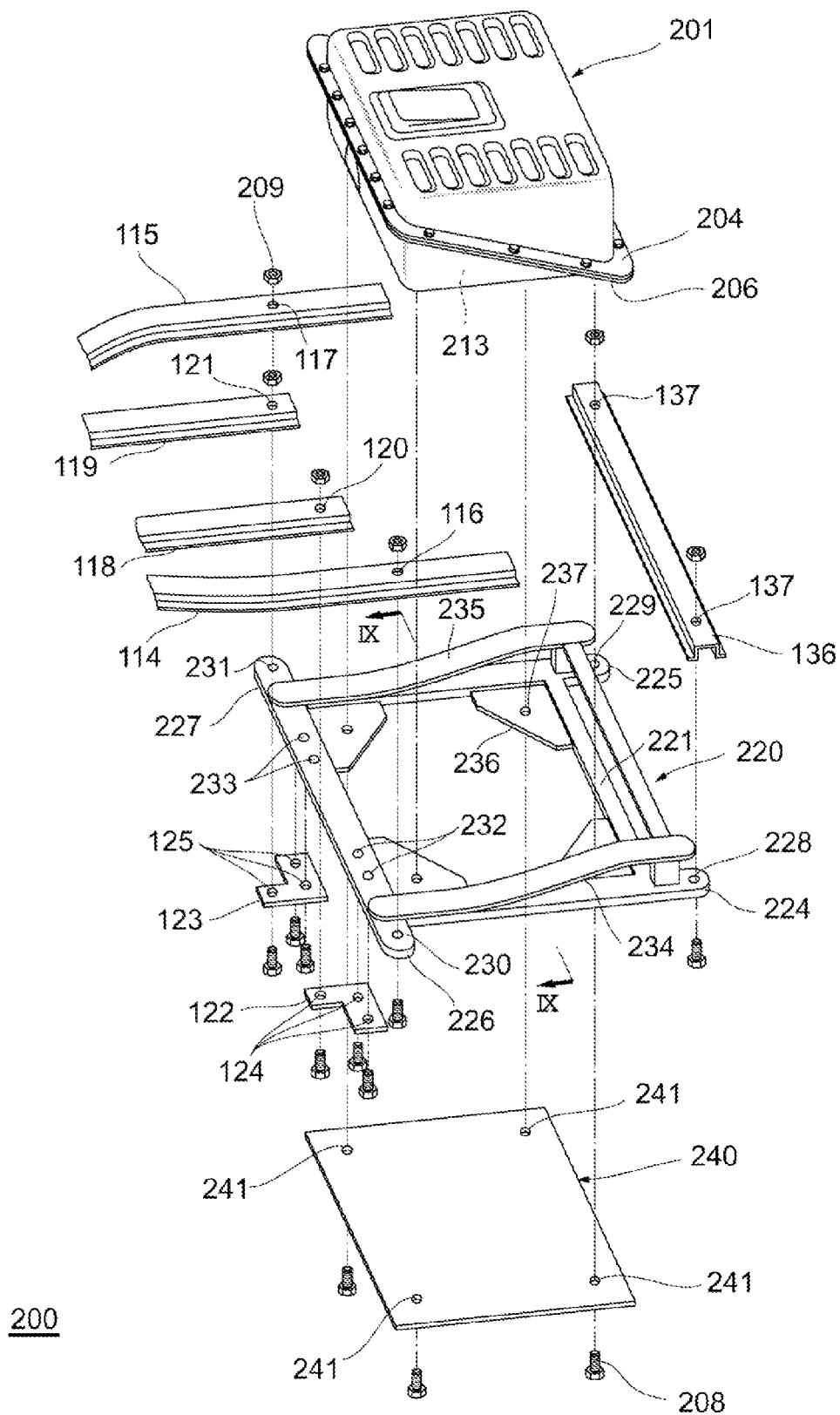
FIG. 6 is an exploded perspective view of the fuel cell assembly 200 according to Embodiment 1.

FIG. 6 shows an exploded perspective view of the fuel cell assembly 200 according to Embodiment 1.

As shown in FIG. 6, the fuel cell assembly 200 is configured by disposing the fuel cell unit 201 on the upper surface side of the protective structural body 220 and disposing the under-panel 240 on the lower surface (bottom surface) side.

The under-panel 240 is protective means for protecting the fuel cell unit 201 from impacts (road surface interference) from the bottom surface of the vehicle shown in FIG. 2. Tightening holes 241 for mounting on the bottom surface of the protective structural body 220 are provided in four corners of the under-panel 240. The detailed structure of the under-panel 240 will be described below with reference to FIG. 8.

As shown in FIG. 6, the fuel cell unit 201 is mounted from the upper side of the protective structural body 220, and the under-panel 240 is mounted from the lower side of the protective structural body 220. More specifically, the fuel cell unit 201 is disposed so that a bottom surface 213 of the fuel cell unit 201 is in contact with the upper surface side of a mounting seat 236 provided on the inner side of the frame structural body 221 of the protective structural body 220. The under-panel 240 is fitted onto the rear surface of the mounting seat 236 provided on the inner side of the frame structural body 221. Further, bolts 208, which are tightening members, are inserted from below the under-panel 240 into respective tightening holes 241 provided in the under-panel 240. The bolts 208 are further inserted into tightening holes 237 provided in the mounting seat 236 and screwed into screw holes provided in the bottom surface 213 of the fuel cell unit 201. By such tightening, the fuel cell unit 201 and the under-panel 240 are integrated with the protective structural body 220, thereby constituting the fuel cell assembly 200.

The protective structural body 220 integrated in the above-described manner is mounted on the vehicle 100 as shown in FIGS. 2 to 4. First, the mounting members 226 and 227 on the vehicle front side of the protective structural body 220 are mounted on the front frames 114 and 115 shown in FIG. 3. The mounting portion 226 is tightened by inserting the bolt 208, which is a tightening member, from one side into the tightening hole 230 of the mounting member and the tightening hole 116 of the front frame 114 and screwing the nut 209 onto the bolt from the other side. The mounting portion 227 is tightened by inserting the bolt 208 from one side into the tightening hole 231 of the mounting member and the tightening hole 117 of the front frame 115 and screwing the nut 209 onto the bolt from the other side.

As shown in FIG. 6, the side member on the vehicle front side of the protective structural body 220 is strongly tightened to the sub-frames 118 and 119 shown in FIG. 3 by using the brackets 122 and 123 as reinforcing members. The tightening hole 232 provided in the side member on the vehicle front side of the protective structural body 220 is positioned to be aligned with the tightening hole 120 of the sub-frame 118 and the tightening hole 124 of the bracket 122. Then, the bolt 208, which is a tightening member, is inserted from one side and the nut 209 is screwed onto the ball from the other side, thereby ensuring tightening to the end portion of the sub-frame 118. Further, the tightening hole 233 provided in the side member on the vehicle front side of the protective structural body 220 is positioned to be aligned with the tightening hole 121 of the sub-frame 119 and the tightening hole 125 of the bracket 123. Then, the bolt 208 is inserted from one side and the nut 209 is screwed onto the ball from the other side, thereby ensuring tightening to the end portion of the sub-frame 119. Since the brackets 122 and 123 are used as the reinforcing members, the subframes 118 and 119 and the protective structural body 220 are tightened extremely strongly. The brackets 122 and 123 may be also further fixed to the protective structural body 220 by welding. Where fixing by welding is used, the tightening is stronger than in the case which fixing is performed by the tightening members such as bolts and nuts.

The mounting portions 224 and 225 provided in the corners of the vehicle rear side of the protective structural body 220 are tightened to the third cross member 136 shown in FIG. 3. Thus, the tightening holes 228 and 229 of the mounting portions 224 and 225 and the tightening hole 137 of the third cross member 136 are aligned, the bolt 208 is inserted from one side, and tightening is performed by screwing the nut 209 onto the bolt from the other side.

The side surfaces 210 and 211 of the fuel cell unit 201 where the inclined portions of the upper flange 204 and lower flange 206 are disposed are mounted on the mounting seats 236 so as to face in the vehicle width direction. This is done so because where the surface provided with the flange faces in the vehicle width direction, the resistance of the fuel cell unit 201 to impacts occurring in the event of collision from the transverse direction can be increased.

The fuel cell unit 201 is tightened to the protective structural body 220 with orientation such that the inclined portions of the upper flange 204 and lower flange 206 become lower with a transition from the vehicle front side to the vehicle rear side. By contrast, the inclined frames 234 and 235 of the protective structural body 220 are disposed so as to rise with a transition from the vehicle front portion to the vehicle rear portion. Therefore, the fuel cell unit 201 is mounted on the protective structural body 220 so that the inclination direction of the flanges in the fuel cell unit 201 is opposite to the inclination direction of the inclined frames 234 and 235 of the protective structural body 220. By disposing the inclined structural bodies disposed in the opposing positions so that they face in the mutually opposite directions, it is possible to increase further the mechanical strength of the fuel cell assembly 200. This is because an alternate structure is produced that has very high rigidity against impacts.

Converter Assembly 250

Figure 7:
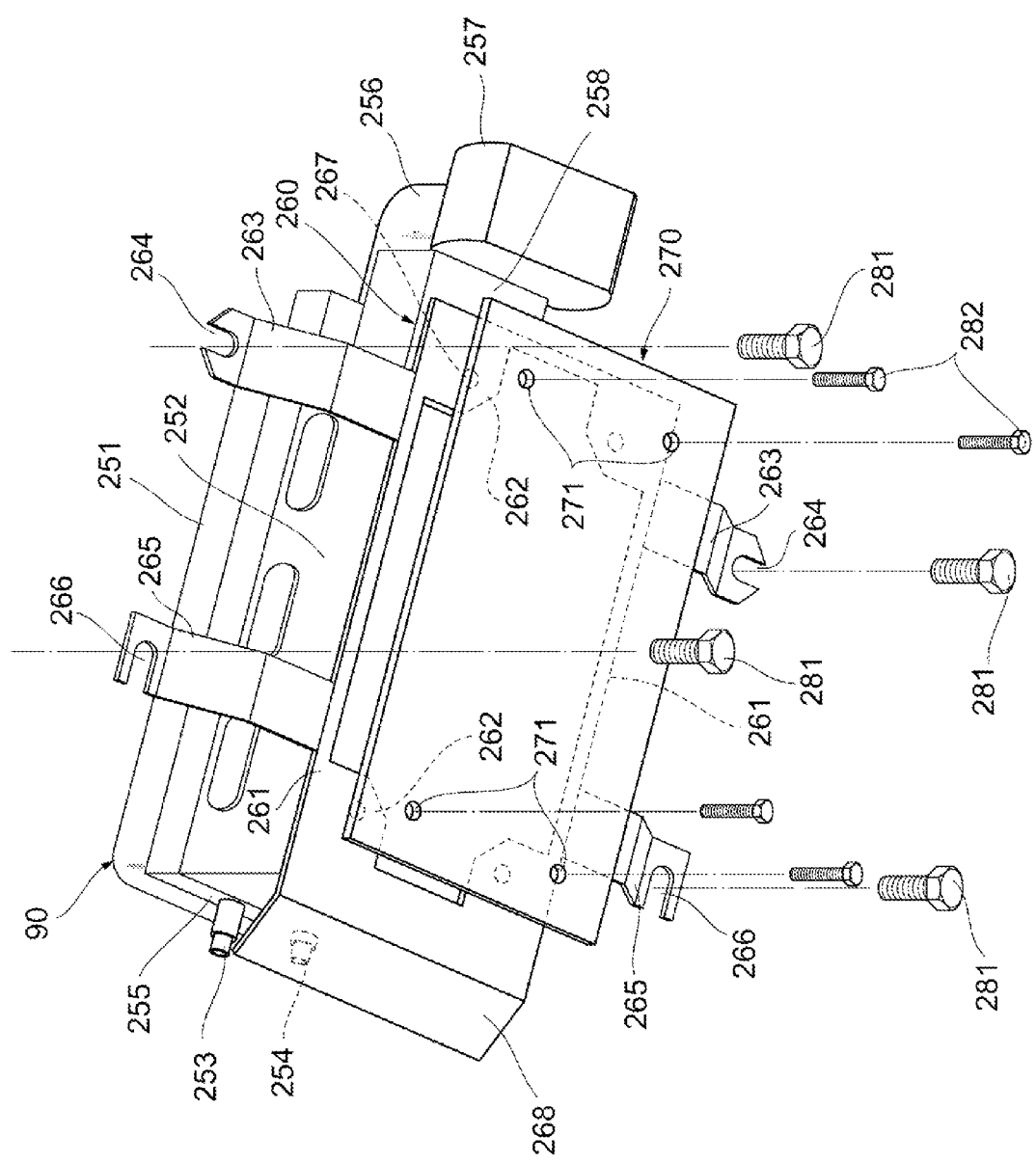
FIG. 7 is a perspective view of the bottom surface illustrating the structure of the converter assembly 250 according to Embodiment 1.

The structure of the converter assembly 250 will be described below in greater detail with reference to FIG. 5 mentioned hereinabove and FIG. 7. FIG. 7 is a perspective view of the bottom surface illustrating the structure of the converter assembly 250.

As shown in FIGS. 5 and 7, in the converter assembly 250, the FC converter 90 is disposed on the upper surface side of the protective structural body 260, and the under-panel 270 is disposed on the lower surface (bottom surface) side.

The FC converter 90 is constituted by an upper housing 251 and a lower housing 252. A cooling liquid inlet 253 and a cooling liquid outlet 254 are provided in a front surface 255 of the FC converter 90. A power cable 256 is provided on the rear side of the FC converter 90 and electrically connected by a terminal connector 257 to the fuel cell 20 provided inside the fuel cell unit 201. A relay unit 258 is provided at the bottom surface on the rear side of the FC converter 90 and accommodates a relay 97 shown in FIG. 1. Where a collision impact in excess of a predetermined value is applied, the relay unit 258 electrically cuts off the secondary-side terminals located inside the FC converter 90 from the input terminals of the inverter 93 and inverter 95 and also from the secondary-side terminals of the battery converter 98.

A power cable 282 provided with a power plug 283 at the distal end thereof is connected to the rear portion of the FC converter 90 to enable power supply to the vehicle travel motor 94.

The protective structural body 260 is protective means for protecting the FC converter 90 from road surface interference, that is, from impacts of collisions from the lower surface side of the vehicle. In the protective structural body 260, an under-panel 270 is provided at the lower surface (bottom surface) of a frame structural body 261 provided with mounting portions 263 and 265.

The mounting portion 263 is provided on the vehicle rear side of the protective structural body 260, and the mounting portion 265 is provided on the vehicle front side. The mounting portions 263 and 265 are members that hold the protective structural body 260 at four points of diagonals, and the curved structure such as shown in the figure is provided. The mounting portion 263 on the vehicle rear side has at the distal end thereof a tightening groove 264 opened in the vehicle width direction. The mounting portion 265 on the vehicle front side has at the distal end thereof a tightening groove 266 opened in the vehicle front direction. The pair of mounting portions 263 and the pair of mounting portions 265 insert bolts 281 into the respective tightening grooves 264 and 266 to be tightened to the tightening holes of the sub-frames 118 and 119. The tightening groove 266 of the mounting portion 265 on the vehicle front side is opened in the vehicle front direction, whereas the tightening groove 264 of the mounting portion 263 on the vehicle rear side is opened in the vehicle width direction. As a result, when an impact is applied from the vehicle front side to the converter assembly 250, the tightening groove 266 of the mounting portion 265 on the vehicle front side is more likely to become loose and separate from the bolt 281 than the tightening groove 264 of the mounting portion 263 on the vehicle rear side. Respective mounting seats 262 are provided in the four inner corners of the frame structural body 261. A tightening hole 267 is provided in each of the mounting seats 262.

The under-panel 270 is protective means for protecting the FC converter 90 from collision (road surface interference) from the lower surface of the vehicle shown in FIG. 2. Tightening holes 271 for mounting on the mounting seat 262 of the protective structural body 260 are provided in the four corners of the under-panel 270. The detailed structure of the under-panel 270 will be explained below with reference to FIG. 8.

An impact suppressing portion 268 projecting so as to be bent backward is provided on the front side of the protective structural body 260. The impact suppressing portion 268 is molded integrally with the frame structural body 261. However, the impact suppressing portion 268 may be also configured as a structure separated from the frame structural body 261, so as to be mounted on the FC converter 90. The impact suppressing portion 268 is formed so that the normal of the projection surface is oriented downward and forward. Because of such a configuration, impacts from the front and below can be effectively received.

Under-Panels 240 and 270

The structures of the under-panels 240 and 270 in the present embodiment will be explained below. The under-panel 240 disposed at the protective structural body 220 and the under-panel 270 disposed at the protective structural body 260 have similar internal structures, but different external shapes. The explanation below will refer to both structures together. The number in parentheses below indicates the reference number of the structure in the converter assembly 250.

Figure 8:
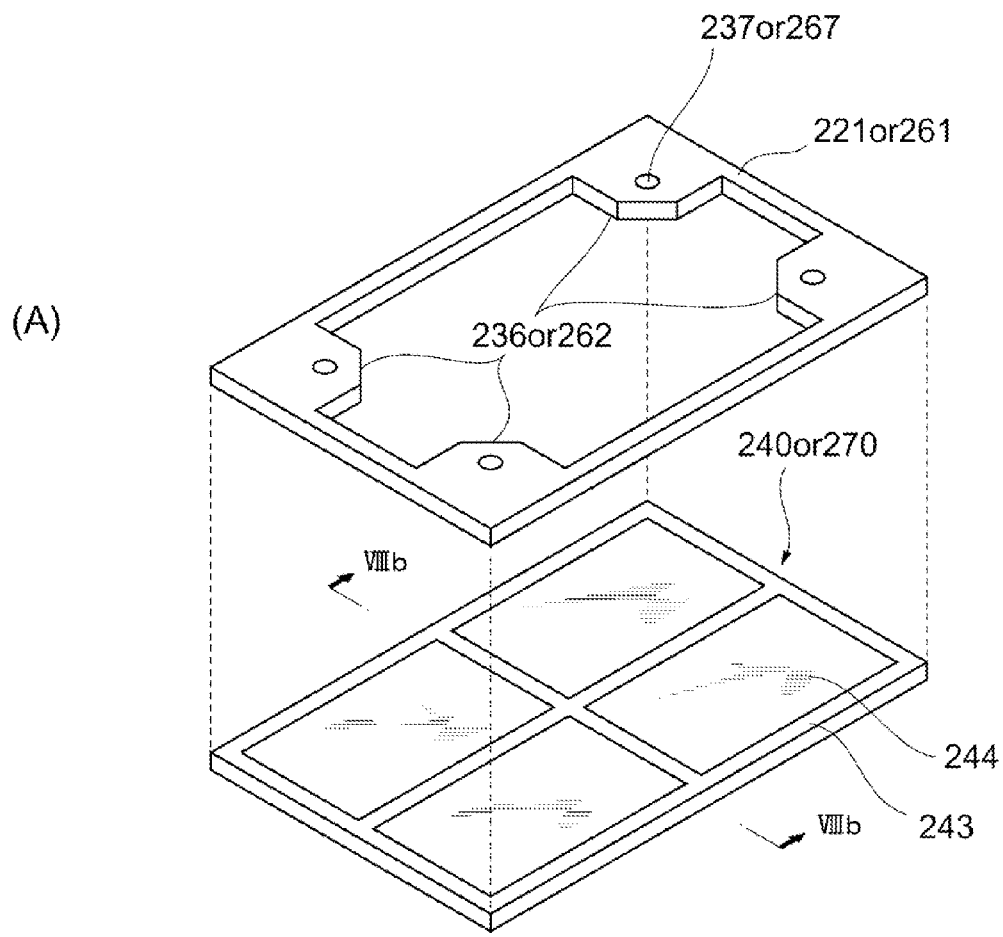
FIG. 8(A) is an exploded perspective view illustrating the structure of the under-panel 240 in Embodiment 1.
FIG. 8(B) is a cross-sectional view of the under-panel 240 (270) in the VIIIb cross section of FIG. 8(A).
Figure 8:
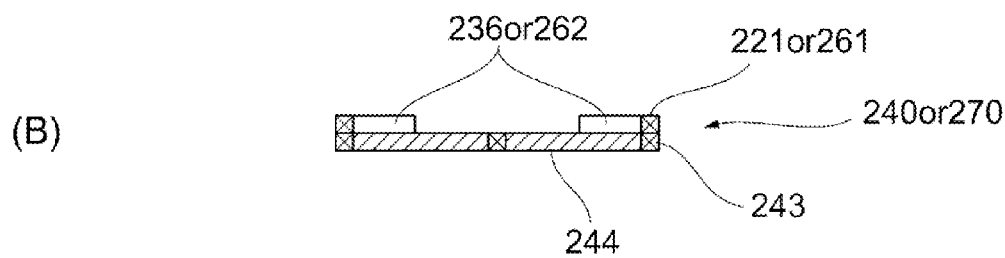

FIG. 8 is an exploded perspective view illustrating the structure of the under-panel 240 (270) in Embodiment 1. FIG. 8(A) is an exploded perspective view illustrating the structure of the under-panel 240 (270) and the frame structural body 221 (261). The FIG. 8(B) is a cross-sectional view of the under-panel 240 (270) in the VIIIb cross section of FIG. 8(A).

As shown in FIG. 8, the under-panel 240 (270) is assembled from below with the frame structural body 221 (261) of the protective structural body 220 (260) and mounted on the fuel cell unit 201 (see FIG. 6) (FC converter 90 (see FIG. 7)).

With such a configuration, the presence of the frame structural body 221 (261) ensures a gap between the fuel cell unit 201 (FC converter 90) and the under-panel 240 (270). This gap makes it possible for the gas to flow through and provides a flow channel for replacing the gas such as fuel gas. Further, impacts (road surface interference) from the travel surface of the vehicle 100 are received and absorbed by the under-panel 240 (270) provided at the lowermost surface. Therefore, the fuel cell unit 201 (FC converter 90) can be protected from the direct impact of road surface interference.

As shown in FIG. 8, the under-panel 240 (270) is configured to include a reinforcing frame 243. The inside of the frame structure of the reinforcing frame 243 is filled by carbon fibers 244. Carbon fibers are, for example, an aggregate of fibers manufactured by calcining acrylic fibers or the like. The under-panel 240 (270) is constituted by filling the inside of the frame structural body of the reinforcing frame 243 with the carbon fibers 240. Such carbon fibers excel in wear resistance, heat resistance, thermal extension-contraction ability, resistance to acids, low electric conductivity, and resistance to tension. In particular, the carbon fibers are lighter than metals such as aluminum and are suitable as a protective structure of be installed on vehicles for which weight reduction is an important object. Further, since the under-panel 240 (270)

includes the reinforcing frame 243, the rigidity of the entire panel can be increased, while substantially reducing the entire panel in weight by comparison with the configuration made of metal sheets.

Carbon fibers 244 with arranged fiber orientation may be used, but it is more preferred that carbon cloth constituted by crosswise weaving the fibers be used. This is because the strength can be further increased since the carbon cloth is obtained by weaving carbon fibers.

Accommodation of Electric System Components in Fuel Cell Unit 201

Figure 9:
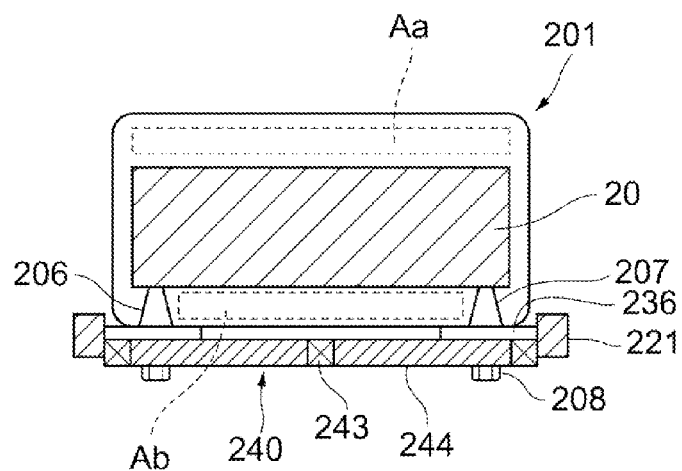
FIG. 9 is a schematic cross-sectional view of the fuel cell unit 201 that illustrates the accommodation space for electric system components according to Embodiment 1.

A schematic cross-sectional view of the fuel cell unit 201 that illustrates the accommodation space for electric system components is shown in FIG. 9. FIG. 9 is a schematic cross-sectional view of the fuel cell assembly 200 taken along the IX section in FIG. 6.

As shown in FIG. 9, in the fuel cell unit 201, the fuel cell 20 is tightened to legs 207. More specifically, the legs 207 are provided at positions corresponding to the tightening holes 237 provided in the mounting seat 236 of the frame structural body 221 and the tightening holes 241 provided in the under-panel 240. The bolts 208 inserted from the rear surface side of the under-panel 240 into the tightening holes 241 and 237 are inserted into the legs 207 so as to tighten the fuel cell 20.

Here, the fuel cell unit 201 is provided in a size such that an upper space Aa is formed above the fuel cell 20, and a lower space Ab is formed below the fuel cell 20. The electric circuit components relating to the fuel cell 20 are accommodated in these upper space Aa and lower space Ab.

In the present embodiment, since the under-panel 240 is provided at the bottom surface side, the protective structural body 220 having the fuel cell unit 201 disposed therein has a very strong structure. Therefore, the space on the upper surface side of the protective structural body 220 that is protected by the protective structural body 220 can be said to be sufficiently protected from impacts from below. Accordingly, in the present embodiment, electric system components that can be assumed to have a low mechanical strength are disposed on the upper surface side of the protective structural body 220. More specifically, such electric system components include sensors such as temperature sensors 32 and 36 (see FIG. 1) that measure the inner temperature of the fuel cell 20 and a cell monitor that measures the fuel cell voltage.

The electric system components may be also provided on the upper surface side of the protective structural body 260 where the FC converter 90 is disposed. For example, the relay unit 258 provided in the rear portion of the FC converter 90 is protected by the protective structural body 260 from road surface interference.

Height Adjustment of Protective Structural Bodies 220 and 260

Figure 10:
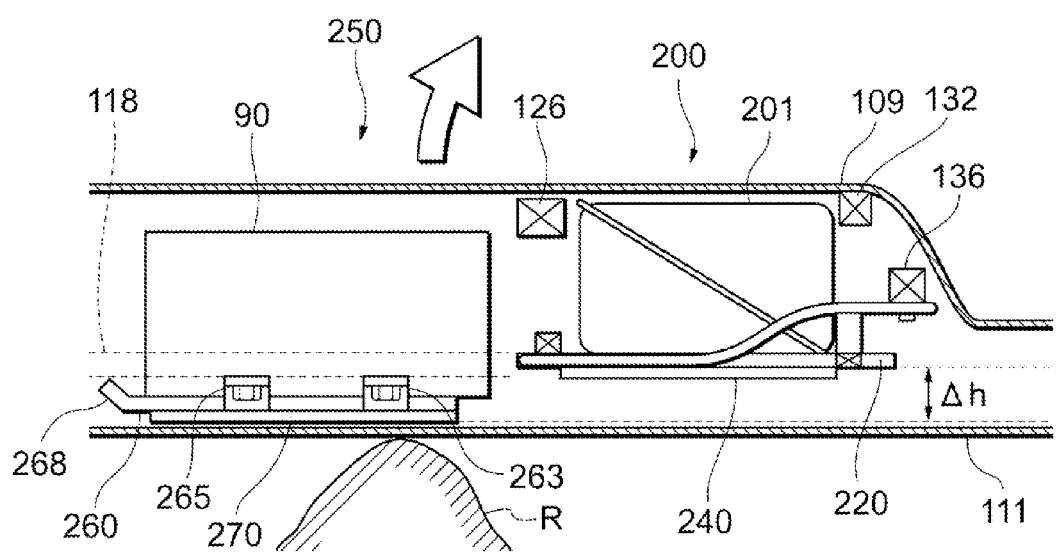
FIG. 10 is an explanatory drawing illustrating the height at which the protective structural body 260 where the converter 90 in Embodiment 1 is provided and the protective structural body 220 where the fuel cell unit 201 is provided are disposed.

FIG. 10 is a schematic side view illustrating the height at which the protective structural body 260 having the converter 90 provided therein and the protective structural body 220 having the fuel cell unit 201 provided therein are disposed. As shown in FIG. 10, the under-panel 240 serving as a bottom surface of the protective structural body 220 having the fuel cell unit 201 provided therein is provided at a position higher than the under-panel 270 serving as a bottom surface of the protective structural body 260 having the FC converter 90 provided therein. Thus, the bottom surface of the fuel cell assembly 200 is disposed at a position higher by a height difference $\Delta h$ than the bottom surface of the converter assembly 250.

By providing the height difference $\Delta h$, it is possible to protect the fuel cell unit 201 effectively from impacts (road surface interference) of collision from the lower surface side.

For example, as shown in FIG. 10, the floor panel 111 is assumed to come into contact with an obstacle R as the vehicle 100 travels. The impact caused by collision with the obstacle R is partially absorbed by the deformation of the floor panel 111, but due to the deformation of the floor panel 111, part of the impact reaches the devices disposed thereabove. In this case, since the under-panel 270 of the converter assembly 250 is disposed at a low position, the under-panel 270 comes into contact with the deformed floor panel 111 and receives the impact of collision. The under-panel 270 serves as a strong protective barrier because of the reinforcing frame 243 and carbon fibers 244. Further, the protective structural body 260 having the under panel 270 disposed on the bottom surface thereof is tightened to the sub-frames 118 and 119 shown in FIG. 3. Therefore, the impact of collision received by the under panel 270 is transmitted via the protective structural body 260 to the sub-frames 118 and 119, and absorbed by vibrations or deformation of the sub-frames 118 and 119. As a result, the effect of collision impact on the fuel cell unit 201 can be suppressed and the fuel cell 20 that has low resistance to collision impacts can be effectively protected.

Which height difference $\Delta h$ to provide between the bottom surface of the fuel cell assembly 200 and the bottom surface of the converter assembly 250 can be determined with consideration for the balance between the occupant cabin volume and the level of impacts from which protection is required. A larger height difference $\Delta h$ makes it possible to protect the fuel cell 20 from stronger impacts. However, as the height difference $\Delta h$ increases, the height of the tunnel portion 109 or front sheet 103 should be increased and therefore the occupant cabin volume is decreased.

Merits of Embodiment 1

(1) In the fuel cell system according to Embodiment 1, the fuel cell unit 201 is disposed at the protective structural body 220 having the under-panel 240 provided on the bottom surface thereof, and the FC converter 90 is provided on the protective structural body 260 having the under-panel 270 disposed on the bottom surface thereof. Therefore, the gap is ensured between the fuel cell unit 201, FC converter 90, and under-panels 240 and 260, and the fuel gas can be ventilated. Further, since the under-panels 240 and 270 are provided on the lowermost surface, the fuel cell unit 201 and the FC converter 90 can be effectively protected from impacts from the lower surface.

(2) With the fuel cell system according to Embodiment 1, since the under-panels 240 and 260 include the reinforcing frame 243, the rigidity of the entire panel can be increased.

(3) With the fuel cell system according to Embodiment 1, since the under-panels 240 and 260 are configured to include carbon fibers 244, the under-panels that excel in wear resistance, heat resistance, thermal extension-contraction ability, resistance to acids, low electric conductivity, and resistance to tension can be provided. In particular, since carbon fibers are lighter than metals such as aluminum, this configuration is suitable as a protective structure to be installed on a vehicle.

(4) With the fuel cell system according to Embodiment 1, the impact suppressing portion 268 that suppresses impacts from the forward movement direction is provided at the protective structural body 260 provided for the FC converter 90. As a result, the impact suppressing portion 268 suppresses impacts from the forward movement direction and therefore impacts from the front and below, which can be assumed to occur when the fuel cell system is located on the traveling vehicle 100, can be effectively moderated.

(5) With the fuel cell system according to Embodiment 1, the protective structural body 220 provided for the fuel cell unit 201 is tightened to the front frames 114 and 115, subframes 118 and 119, and also third cross member 136. The protective structural body 260 provided for the FC converter 90 is tightened to the sub-frames 118 and 119. Therefore, since the protective structural bodies 220 and 260 are tightened to the vehicle structure, the fuel cell unit 201 and FC converter 90 that have a comparatively low rigidity can be effectively protected from collision impacts.

(6) With the fuel cell system according to Embodiment 1, the bottom surface of the fuel cell assembly 200 is disposed at a position that is higher by the height difference Δh than the bottom surface of the converter assembly 250. Therefore, collision impacts from the travel surface are received by the protective structural body 260 of the FC converter 90 and therefore the fuel cell 20, which has low resistance to collision impacts from the travel surface, can be effectively protected.

(7) The upper space Aa is provided above the fuel cell 20 and the lower space Ab is provided below the fuel cell inside the fuel cell unit 201, and electric system components that have a low mechanical strength and can be easily fractured are accommodated in the aforementioned spaces. Therefore, the space protected against the impacts from the lower side by the protective structural body 220 can be effectively used.

Embodiment 2

Embodiment 2 of the present invention relates to a variation example of the under-panel.

Figure 11:
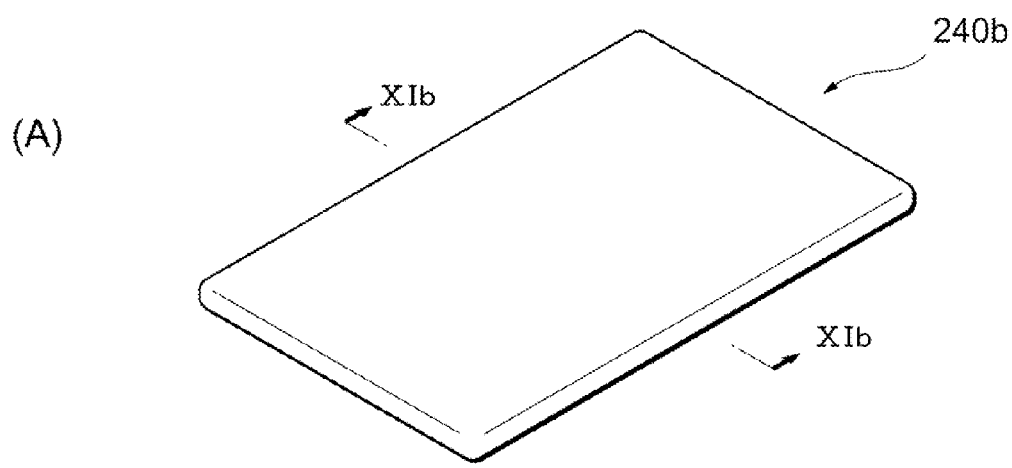
FIG. 11(A) is a perspective view illustrating the structure of the under-panel 240b according to Embodiment 2.
FIG. 11(B) is a cross-sectional view of the under-panel 240b in the XIb cross section in FIG. 11(A).
Figure 11:
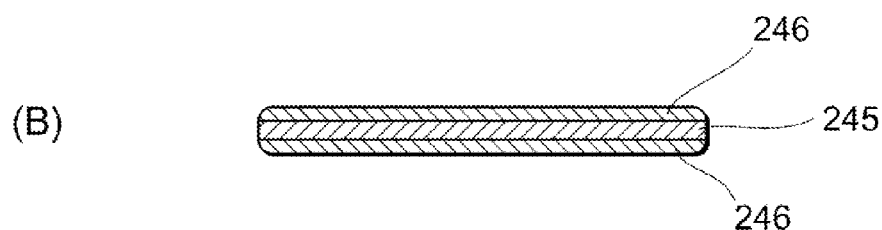

The structure of an under-panel 240b according to Embodiment 2 will be described in FIG. 11. FIG. 11(A) is a perspective view illustrating the structure of the under-panel 240b. FIG. 11(B) is a cross-sectional view of the under-panel 240b in the XIb cross section in FIG. 11(A).

The under-panel 240b according to the present embodiment can be disposed at the protective structural body 220 or at the protective structural body 260. Further, either of the protective structural bodies 220 and 260 can be used as the under-panel 240b according to Embodiment 2 and the other can be used as the under-panel 240 (270) according to the abovementioned Embodiment 1.

As shown in FIG. 11(B), the under-panel 240b is constituted by coating a panel 245 with a carbon fiber layer 246. The panel 245 is constituted by a metal material having a predetermined rigidity, for example, aluminum, SUS, and iron. The carbon fiber layer 246 can be formed by coating one surface or both surfaces of the panel 245 with carbon fibers manufactured by calcining acrylic fibers or the like.

The strength of the entire under-panel 240b is determined by the combined strength of the panel 245 and the carbon fiber layer 246. Therefore, the thickness of the panel 245 can be decreased correspondingly to the thickness of the carbon fiber layer 246 formed thereon.

Since the under-panel 240b according to Embodiment 2 is equipped with the carbon fiber layer 246 formed by coating with carbon fibers, it is possible to provide a panel that excels in wear resistance, heat resistance, thermal extension-contraction ability, resistance to acids, low electric conductivity, and resistance to tension.

By increasing the thickness of the carbon fiber layer 246 which is lighter than metal such as aluminum and decreasing the thickness of the panel 245, it is possible to reduce the panel in weight, while maintaining the strength of the entire panel.

Therefore, by disposing the under-panel 240b according to Embodiment 2 on the bottom surface of the protective structural body 220 or 260, it is possible to reduce the weight of the vehicle 100, while protecting the fuel cell unit 201 or FC converter 90 from collision impacts from the lower side.

The carbon fiber layer 246 may be constituted by carbon cloth. Where carbon cloth is used, the strength can be further increased.

Other Variation Examples

The present invention is not limited to the abovementioned embodiments and can be changed variously.

(1) For example, in the abovementioned embodiments, the FC converter 90 is presented by way of example as a related device that is the object of protection, but other devices may be similarly protected. For example, constituent components of the electric system 9, such as the battery converter 98, inverter 93, inverter 95, and battery 91, and also constituent components of the cooling liquid supply system 3, fuel gas supply system 4, and oxidizing gas supply system 7 may be considered as objects for protection.

(2) The structure of the protective structural bodies 220 and 260 and structures of the under-panels 240, 240b and 270 in the abovementioned embodiments are merely exemplary, and a variety of well-known structures capable of increasing the mechanical strength, while enabling weight reduction, can be used.

(3) In the abovementioned embodiments, the impact suppressing portion 268 is provided at the protective structural body 260 where the FC converter 90 is provided, but the impact suppressing portion may be also provided at the protective structural body 220 where the fuel cell unit 201 is provided. This is because where the impact suppressing portion is provided at the protective structural body disposed at a position to which impacts are applied from the front and below, the impacts from the front and below can be effectively moderated.

(4) In the abovementioned embodiments, the spaces Aa and Ab accommodating the electric system components are provided inside the fuel cell unit 201, but the electric system components may be accommodated outside the fuel cell unit 201. Further, a configuration may be used in which the electric system components are accommodated between the FC converter 90 and the protective structural body 260 or above the FC converter 90. The components to be accommodated are not limited to electric system component. Any component that has low resistance to impacts may be accommodated for protection in the space protected by the protective structural body 220 or 260.

INDUSTRIAL APPLICABILITY

The fuel cell system in accordance with the present invention can be used not only with fuel cell vehicles in which the fuel cell system is installed on a vehicle, but also at any mobile body that requires protection of fuel cells from impacts. Examples of suitable mobile bodies include railroad trains, ships, aircrafts and submarines. Where the configuration of the fuel cell system in accordance with the present invention is used, the fuel cell, which is the most important component, and related devices can be effectively protected form collision impacts from below, regardless of the type of mobile body. In particular, even with mobile bodies with weight restrictions, by using the present invention, it is possible to protect effectively the fuel cell and related devices from impacts by using a lightweight structure.

REFERENCE SIGNS LIST 3 cooling liquid supply system
4 fuel gas supply system
7 oxidizing gas supply system
9 power system 10 fuel cell system
20, 20b, 20c fuel cells
21 polymer electrolyte membrane
22 anode electrode
23 cathode electrode
24 membrane-electrode assembly
25 anode gas channel
26 cathode gas channel
31 cooling channel
32 temperature sensor
33 radiator
34 valve
35 cooling liquid pump
36 temperature sensor
40 fuel gas supply channel
42 fuel gas supply device
42a first fuel gas tank
42b second fuel gas tank
43 main valve
44 pressure sensor
45 ejector
46 cut-off valve
51 circulation channel
52 cur-off valve
53 gas-liquid separator
54 discharge valve
55 hydrogen pump
57 revolution speed sensor
58, 59 pressure sensors
61 exhaust gas flow channel
62 diluter
63 purge valve
65 muffler
71 oxidizing gas supply channel
72 oxidation off-gas discharge channel
73 pressure sensor
74 air cleaner
75 air compressor
76 humidifier
77 pressure regulating valve
80 control unit
82 ignition switch
84 voltage sensor
86 current sensor
90 fuel cell DC-DC converter (FC converter)
91 battery
92 battery computer
93, 95 inverter
94 vehicle travel motor
96 high-voltage auxiliary device
97 relay
98 battery DC-DC converter (battery converter)
99 revolution speed sensor
100 vehicle
101 front tire
102 rear tire
103 front seat
103L left front seat
103R right front seat
104 rear seat
105 dashboard
106 front pillar
107 center pillar
108 rear pillar
109 tunnel portion
110 front cross member
111 floor panel
112 front suspension member
113 deformation enhancing portion
114, 115 front frames
116, 117, 120, 121, 124, 125, 137, 205, 207, 228 to 233, 242 to 245 tightening holes
118, 119 sub-frames
122, 123 brackets
126 first cross member
128, 129 side rocker member
130 motor mount
131 mounting rubber
132 second cross member
136 third cross member
138 fourth cross member
140, 141, 152, 153 binders
144, 151 sub-cross members
146, 147 rear rocker members
150 fifth cross member
160 rear cross member
200 fuel cell assembly
201 fuel cell unit
202 upper housing
203 lower housing
204 upper flange
206 lower flange
207 leg
220, 260 protective structural bodies
221, 261 frame structural bodies
224 to 227 mounting portions
234, 235 inclined frames
236, 262 mounting seats
237, 267 tightening holes
240, 240b, 270 under-panel
241, 271 tightening holes
243 frame structural body
244 carbon fiber
245 panel
246 carbon fiber coating layer
250 converter assembly
251, 252 upper housings
253 cooling liquid inlet
254 cooling liquid outlet
255 front surface
256, 282 power cable
257 terminal connector
258 relay unit
263, 265 mounting portions
264, 266 tightening grooves
268 impact suppressing portion
283 power source plug
Aa, Ab accommodation space
R obstacle
Δh difference in height between bottom surfaces

The invention claimed is:

1. A fuel cell system comprising:
a fuel cell unit accommodating a fuel cell; and
a related device disposed adjacently to the fuel cell unit, wherein the related device is an active, constituent element of the fuel cell system, wherein
the fuel cell unit is provided above a first protective structural body,
the related device is provided above a second protective structural body,
an under-panel is provided on at least one of a bottom surface of the first protective structural body and a bottom surface of the second protective structural body and a first gap is provided between at least one of the bottom surfaces of the fuel cell unit and related device and the under-panel, and a floor panel below the under-panel, which covers commonly the fuel cell unit and the related device, is provided below the fuel cell unit and the related device and a second gap is provided between the under-panel and the floor panel.

2. The fuel cell system according to claim 1, wherein the under-panel is configured to include a reinforcing frame.

3. The fuel cell system according to claim 1, wherein the under-panel is configured to include carbon fibers.

4. The fuel cell system according to claim 1, wherein at least one of the first protective structural body and the second protective structural body includes an impact suppressing portion that suppresses impacts from a forward direction of a vehicle.

5. The fuel cell system according to claim 1, wherein
the fuel cell system is installed on a vehicle, and
the first protective structural body and the second protective structural body are tightened to a frame constituting the vehicle.

6. The fuel cell system according to claim 1, wherein the first protective structural body is disposed at a position at a height, from a travel surface of a vehicle, that is greater than another height at which the second protective structural body is disposed from the travel surface.

7. The fuel cell system according to claim 1, wherein an electric system component is accommodated between the fuel cell and the first protective structural body.

8. A vehicle configured to be capable of moving on a travel surface, the vehicle comprising:
a fuel cell unit accommodating a fuel cell; and
a related device disposed adjacently to the fuel cell unit, wherein the related device is an active, constituent element of the fuel cell system, wherein
the fuel cell unit is provided above a first protective structural body,
the related device is provided above a second protective structural body,
an under-panel is provided on at least one of a bottom surface of the first protective structural body and a bottom surface of the second protective structural body and a first gap is provided between at least one of the bottom surfaces of the fuel cell unit and related device and the under-panel, and
a floor panel below the under-panel, which covers commonly the fuel cell unit and the related device, is provided below the fuel cell unit and the related device and a second gap is provided between the under-panel and the floor panel.

* * * * *